US008923270B2

(12) United States Patent
Lee et al.

(10) Patent No.: US 8,923,270 B2
(45) Date of Patent: Dec. 30, 2014

(54) METHOD FOR LINK BUFFER SIZE AND QUEUE LENGTH ESTIMATION FOR BANDWIDTH-VARYING MOBILE DATA NETWORKS

(71) Applicants: Yiu Bun Jack Lee, Kowloon (CN); Chi Fung Chan, Lai King (CN)

(72) Inventors: Yiu Bun Jack Lee, Kowloon (CN); Chi Fung Chan, Lai King (CN)

(73) Assignee: The Chinese University of Hong Kong, Hong Kong (CN)

( * ) Notice: Subject to any disclaimer, the term of this patent is extended or adjusted under 35 U.S.C. 154(b) by 50 days.

(21) Appl. No.: 13/625,583

(22) Filed: Sep. 24, 2012

(65) Prior Publication Data
US 2013/0083654 A1    Apr. 4, 2013

Related U.S. Application Data

(60) Provisional application No. 61/543,238, filed on Oct. 4, 2011.

(51) Int. Cl.
*H04B 7/212*    (2006.01)
*H04L 12/26*    (2006.01)
*H04L 12/841*   (2013.01)
*H04L 12/801*   (2013.01)
*H04W 24/08*    (2009.01)

(52) U.S. Cl.
CPC .............. *H04L 43/08* (2013.01); *H04L 47/283* (2013.01); *H04L 43/0852* (2013.01); *H04L 43/0864* (2013.01); *H04L 47/193* (2013.01); *H04W 24/08* (2013.01)
USPC ........................................................ 370/347

(58) Field of Classification Search
CPC ............................ H04L 49/9005; H04L 47/30
USPC ........................................................ 370/347
See application file for complete search history.

(56) References Cited

U.S. PATENT DOCUMENTS

| 6,408,007 | B1 | 6/2002 | Park | |
|---|---|---|---|---|
| 2007/0189262 | A1* | 8/2007 | Kim et al. | 370/347 |
| 2013/0083657 | A1* | 4/2013 | Gu | 370/230.1 |

FOREIGN PATENT DOCUMENTS

| CN | 1545286 A | 11/2004 |
|---|---|---|
| CN | 101557606 A | 10/2009 |

OTHER PUBLICATIONS

International Search Report and Written Opinion of the International Searching Authority for PCT Application No. PCT/CN2012/082321, mailed on Jan. 3, 2013, 10 pages.

(Continued)

*Primary Examiner* — Fan Ng
(74) *Attorney, Agent, or Firm* — Kilpatrick Townsend & Stockton LLP; Kenneth R. Allen

(57) ABSTRACT

A sum-of-delays algorithm in a digital mobile communication bandwidth-varying network is employed to estimate link buffer size and queue length in an undying network connection. In particular, mechanisms associated with the process compensate for link bandwidth variations. In a particular embodiment, passive estimation are employed to implement the process by simply measuring the in-band data packet timings to perform estimation, thus eliminating the need for transmission of extra measurement packets. This method enables the integration of the link buffer size estimation algorithm into existing transport protocols such as TCP to optimize flow and congestion controls. As part of the invention, a new congestion control method called TCP Queue-length-Adaptive (TCP-QA) is developed to employ the sum-of-delays algorithm in the TCP sender computer to control the data flow in a TCP connection. Compared to existing TCP variants, TCP-QA can achieve significantly better network bandwidth utilization in bandwidth-varying networks.

14 Claims, 18 Drawing Sheets

(56) References Cited

OTHER PUBLICATIONS

Ait-Hellal et al., "Problems in TCP Vegas and TCP Reno," DNAC (De Nouvelles Architectures pour les Communications), UVSQ, Paris, Dec. 3-5, 1996, 16 pages.
Akella et al., "An Empirical Evaluation of Wide-Area Internet Bottlenecks," ACM 1-58113-773-7/03/0010 (2003) 14 pages.
Astely et al., "LTE: The Evolution of Mobile Broadband," IEEE Communications Magazine, 0163-6804/09 (Apr. 2009) 8 pages.
Brakmo et al., "TCP Vegas: New Techniques for Congestion Detection and Avoidance," TR 94 04, Dept. of Computer Science, University of Arizona (Feb. 1994) 19 pages.
Claypool et al., "Interring Queue Sizes in Access Networks by Active Measurement," CS Department at Worcester Polytechnic Institute, 5th Passive and Active Network Measurement Workshop (PAM), Antibes Juan-les-Pins, France, Apr. 19-20, 2004, 10 pages.
Downey et al., "Using pathchar to estimate Internet link characteristics," ACM 1-58113-135-6/99/0008 (1999) 10 pages.
Floyd et al., "An Extension to the Selective Acknowledgement (SACK) Option for TCP," The Internet Society (2000) 18 pages.
Fu et al., "TCP Veno: TCP Enhancement for Transmission Over Wireless Access Networks," IEEE vol. 21, No. 2 (Feb. 2003) 13 pages.
Ha et al., "Cubic: A New TCP-Friendly High-Speed TCP Variant," International Workshop on Protocols for Fast and Long Distance Networks (2005) 12 pages.
Hedge et al., "Fast TCP in High-Speed Networks: An Experimental Study," Broadnets 2004, First Annual International Conference on Broadband Networks, Oct. 25-29, 2004, San Jose, CA, 9 pages.
Hirabaru, Masaki, "Impact of Bottleneck Queue Size on TCP Protocols and Its Measurement," IEICE Trans Commun, vol. E89-B, No. 1 (Jan. 2006), 9 pages.
Lakshminarayanan et al., "Some Findings on the Network Performance of Broadband Hosts," ACM 1-58113-773-7/03/0010 (2003) 6 pages.
Liu, Jun et al., "Using Loss Pairs to Discover Network Properties," Dept. of Computer Sciences, Boston University,—ACM SIGCOMM Internet Measurement Workshop 2001, San Francisco, USA, Nov. 1-2, 2001, 12 pages.
Liu, Ke et al., "Mobile Accelerator: A New Approach to Improve TCP Performance in Mobile Data Networks," 978-1-4577-9538-2/11 (2011) 7 pages.
Mascolo, et al., "TCP Westwood: Bandwidth Estimation for Enhanced Transport over Wireless Links," ACM ISBN1-58113-422-3/01/07 (2001) 11 pages.
Ribeiro et al., "pathChirp: Efficient Available Bandwidth Estimation for Network Paths," SLAC-UPB-9732 (Apr. 2003) 11 pages.

\* cited by examiner

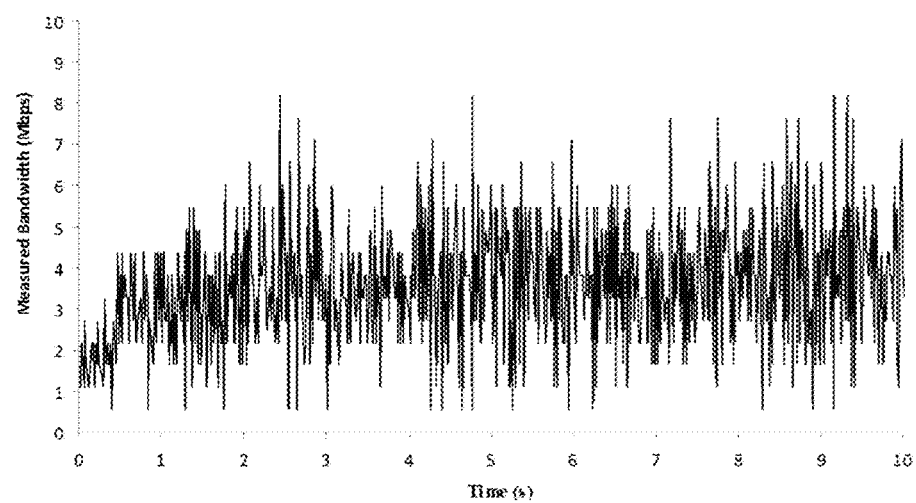
FIG._1
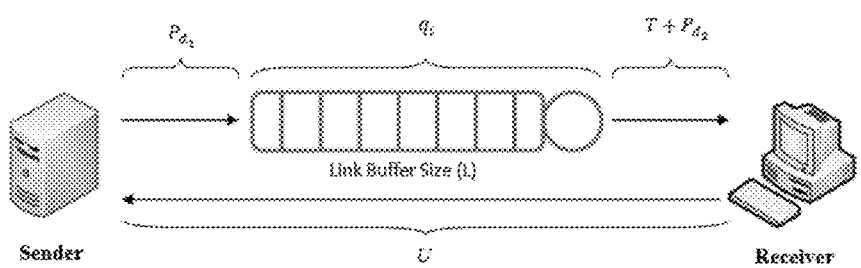
FIG._2
(PRIOR ART)

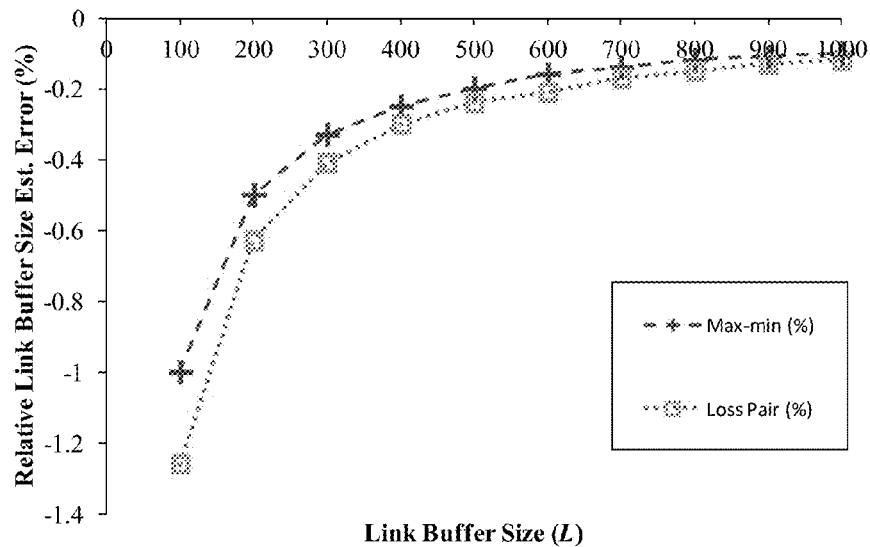
FIG._3
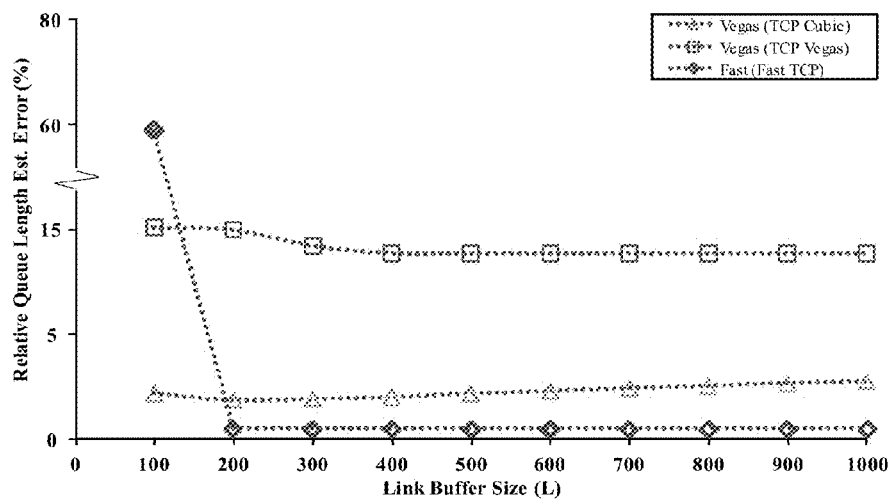
FIG._4

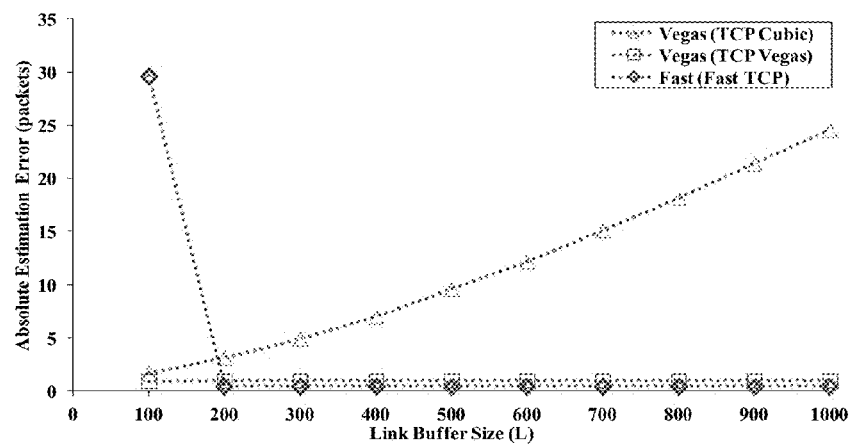
FIG._5
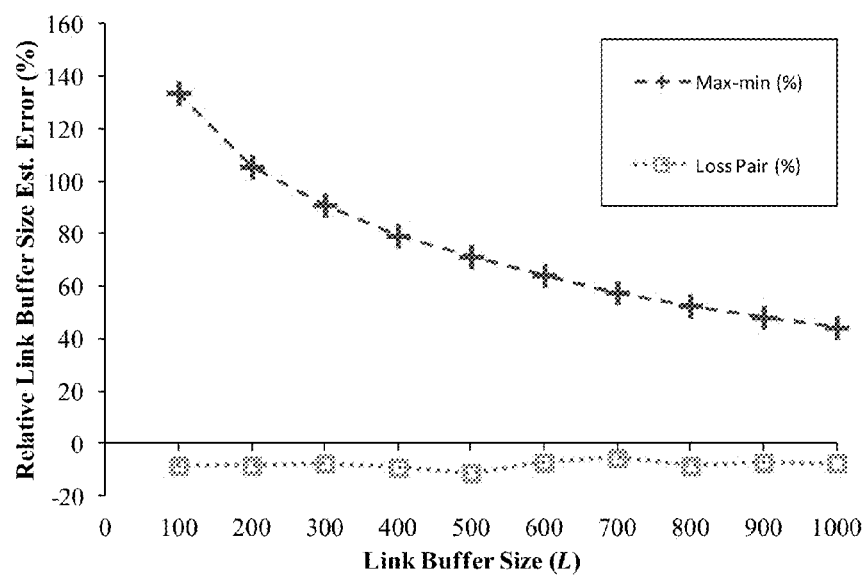
FIG._6

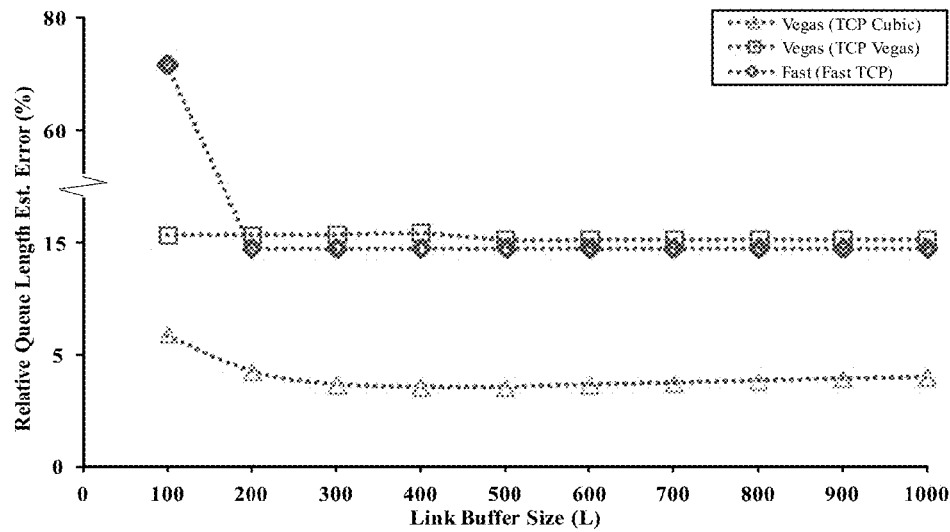
FIG._7
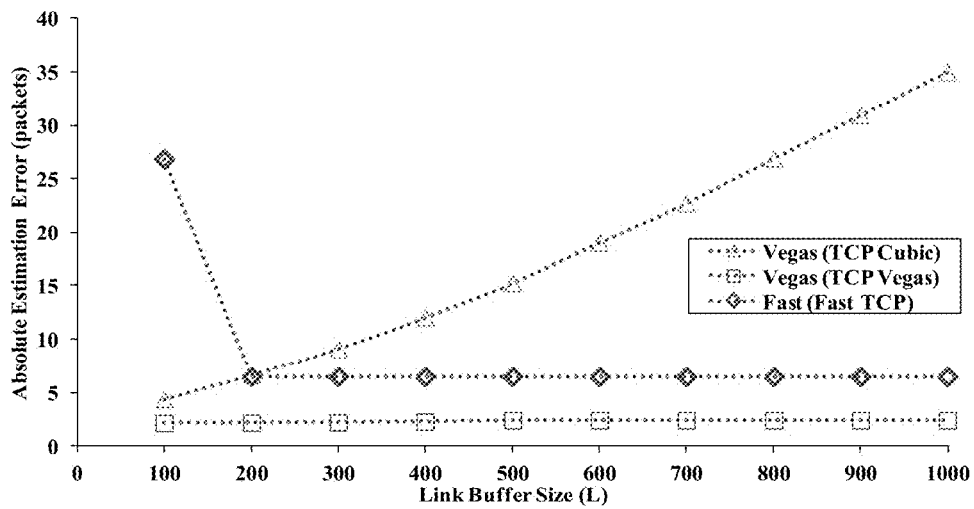
FIG._8

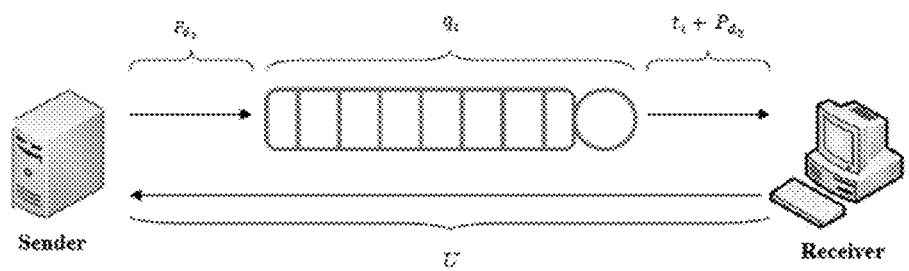
FIG._9
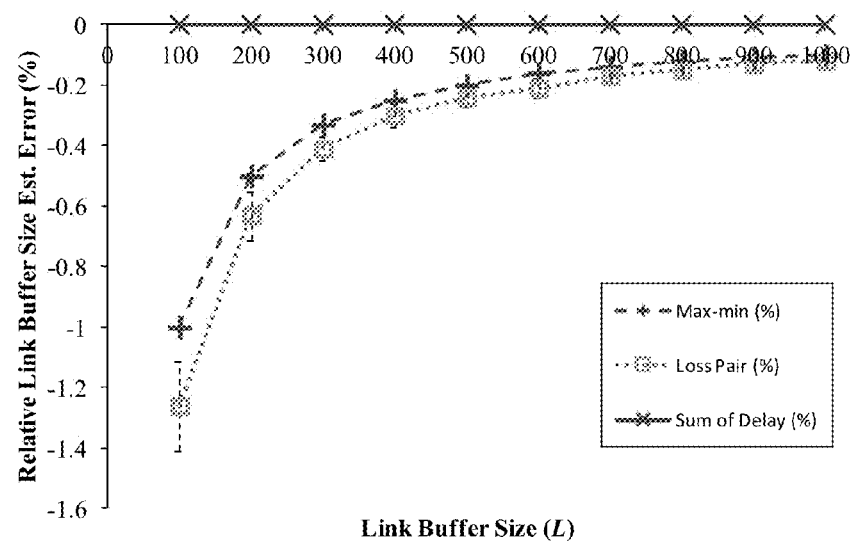
FIG._10

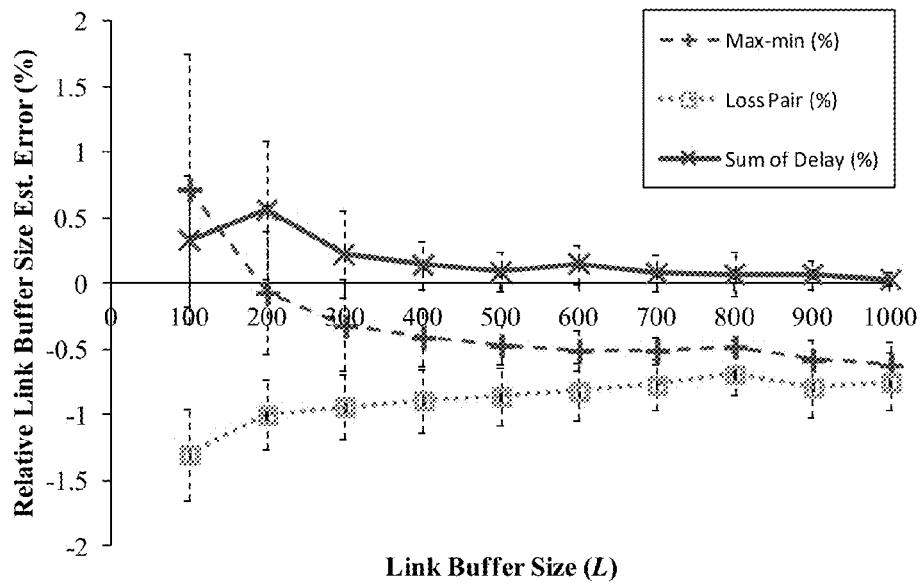
FIG._11
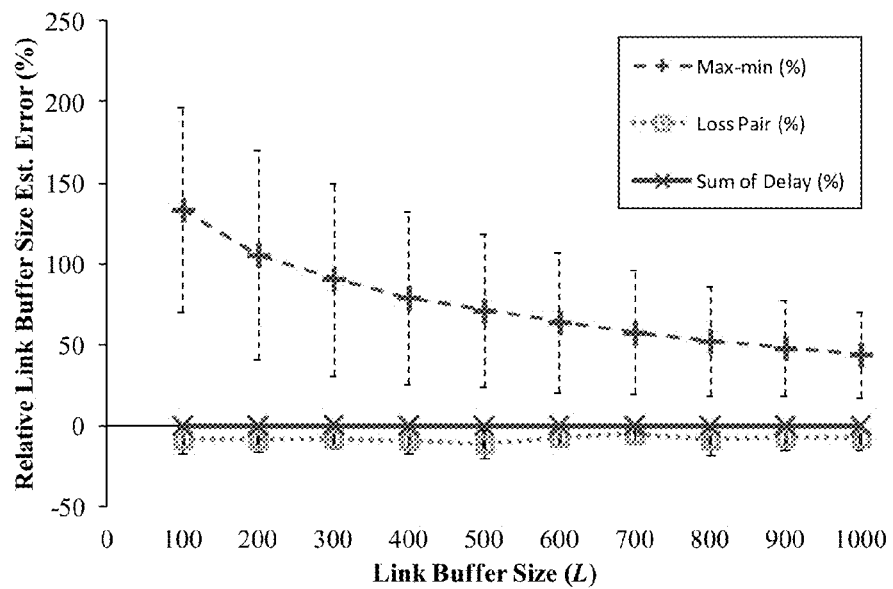
FIG._12

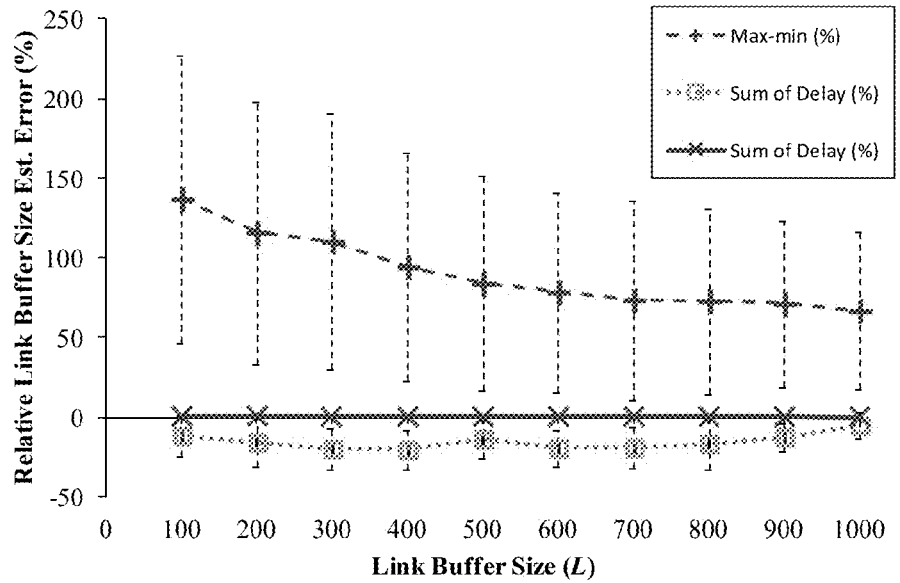
FIG._13
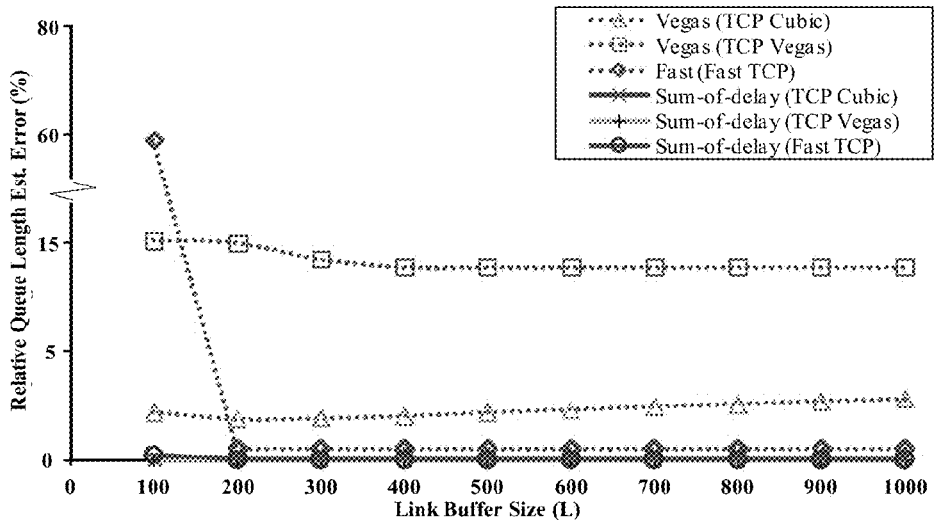
FIG._14

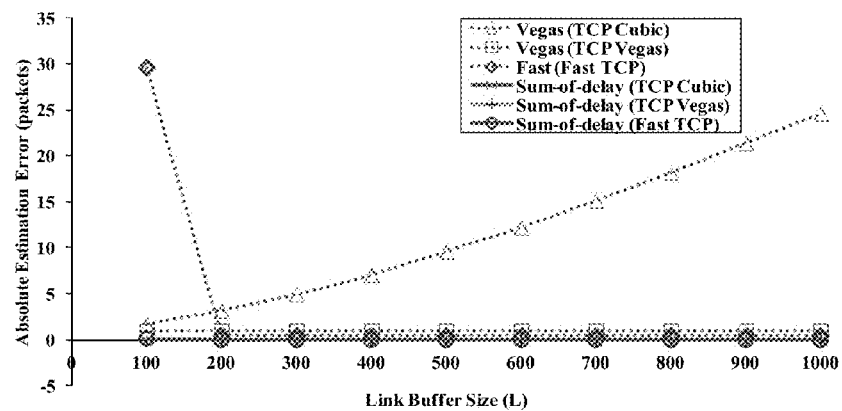
FIG._15
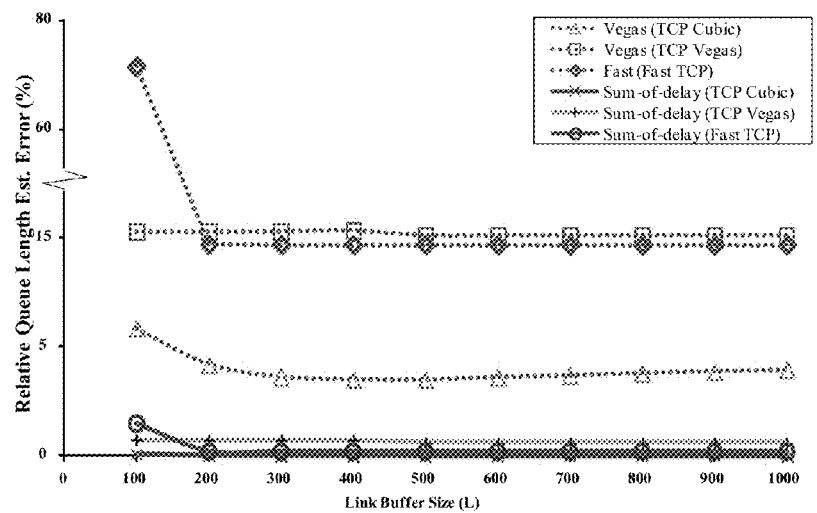
FIG._16

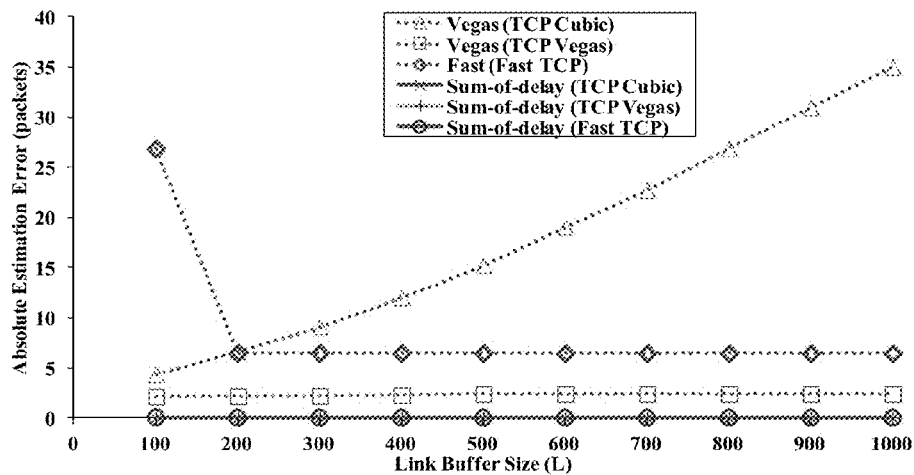
FIG._17
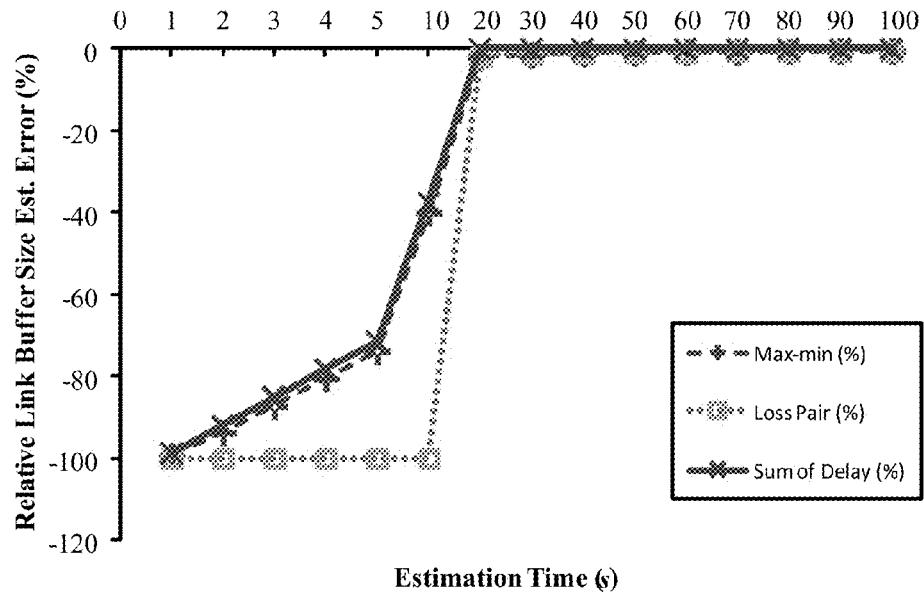
FIG._18(a)

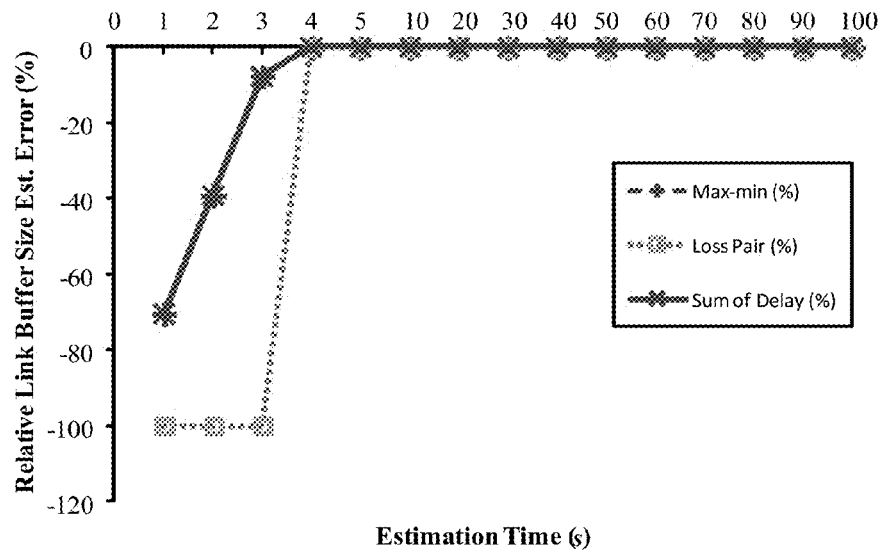
FIG._18(b)
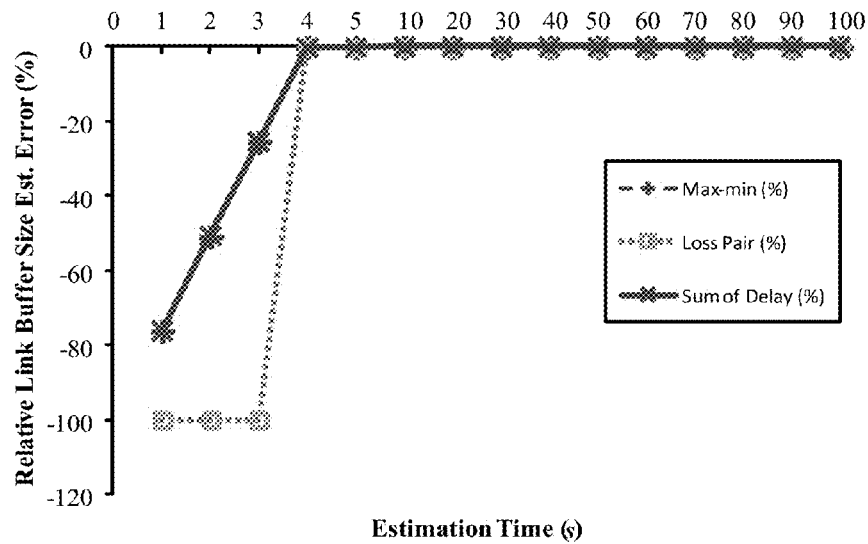
FIG._18(c)

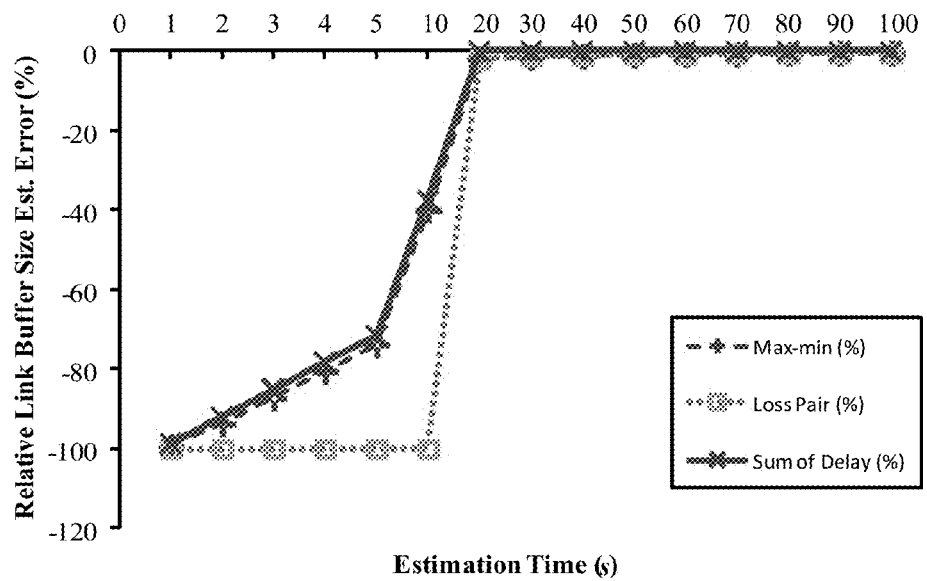
FIG._19(a)
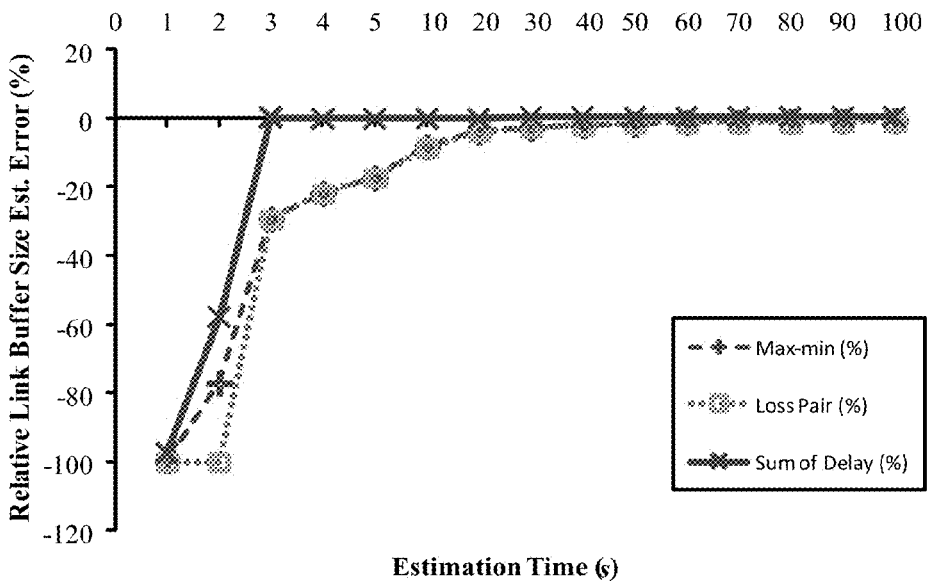
FIG._19(b)

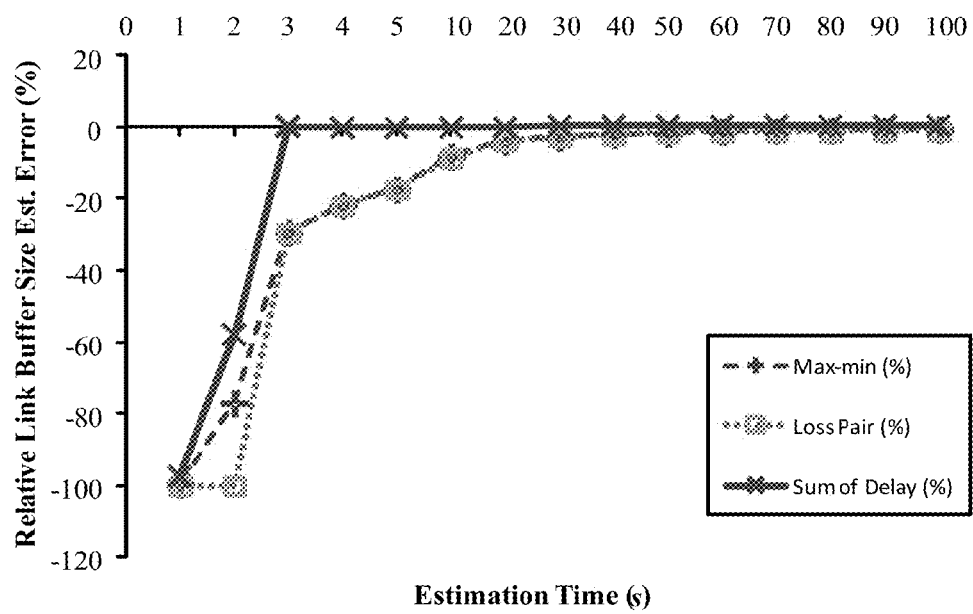
FIG._19(c)

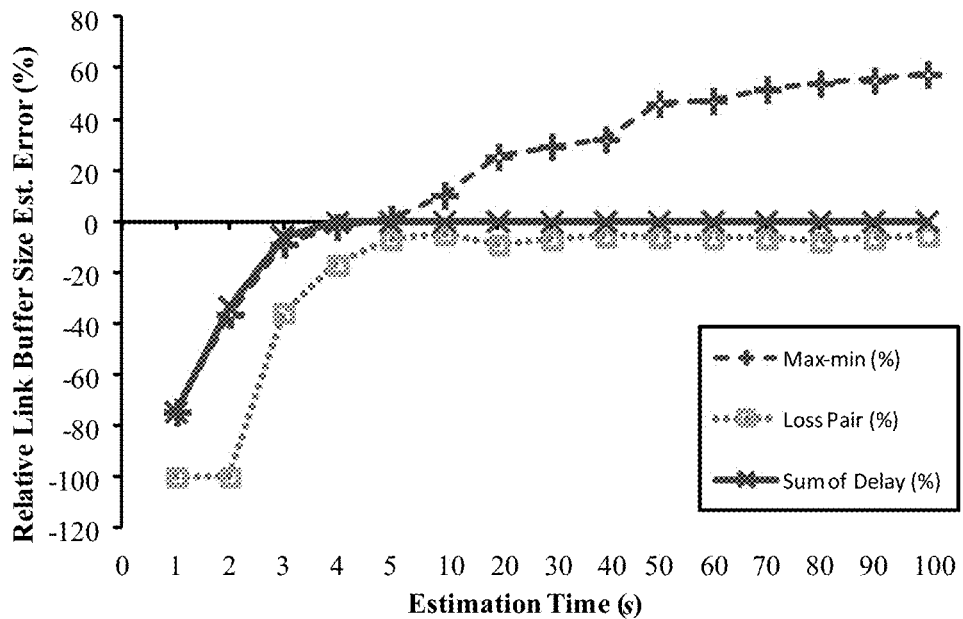
FIG._20
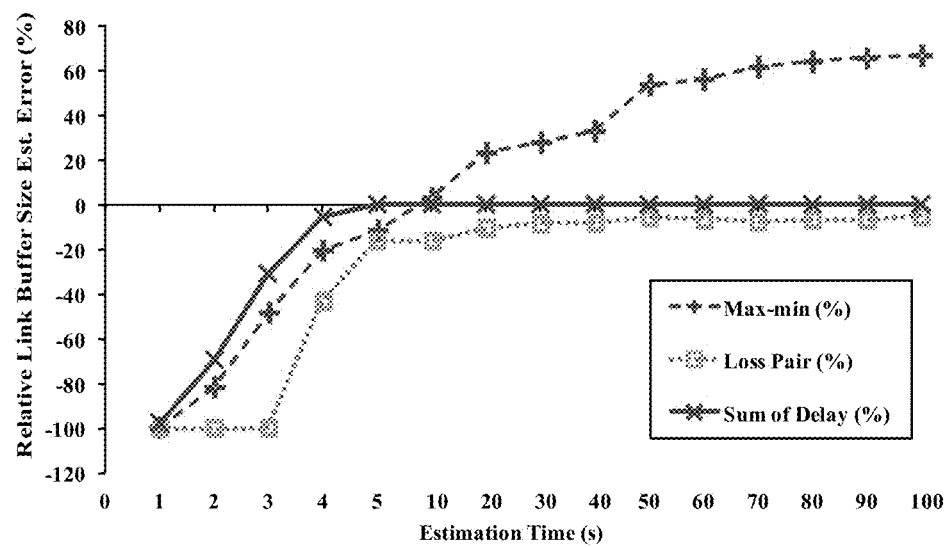
FIG._21

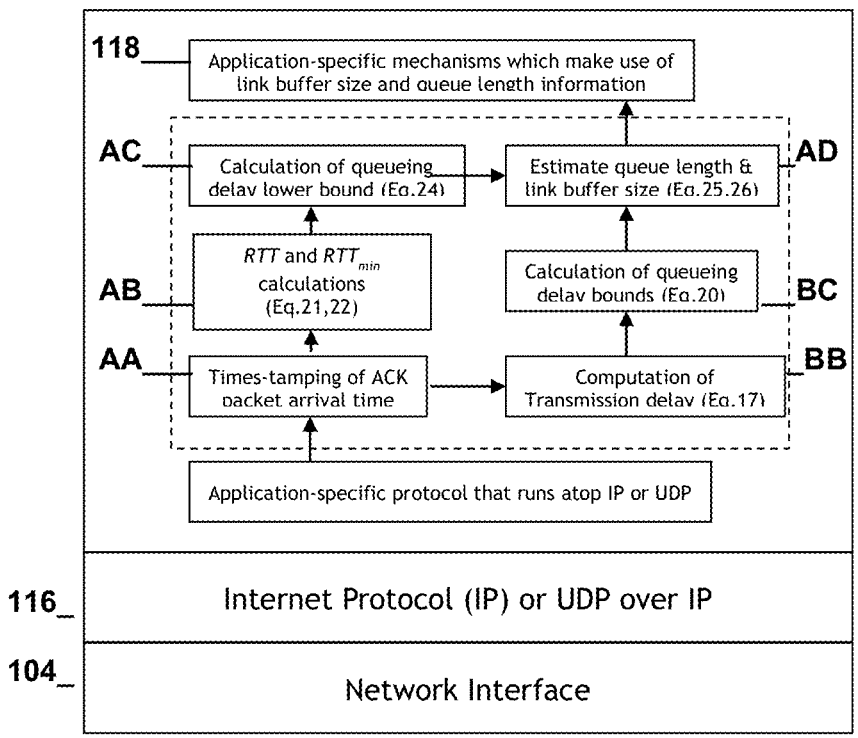
FIG._28

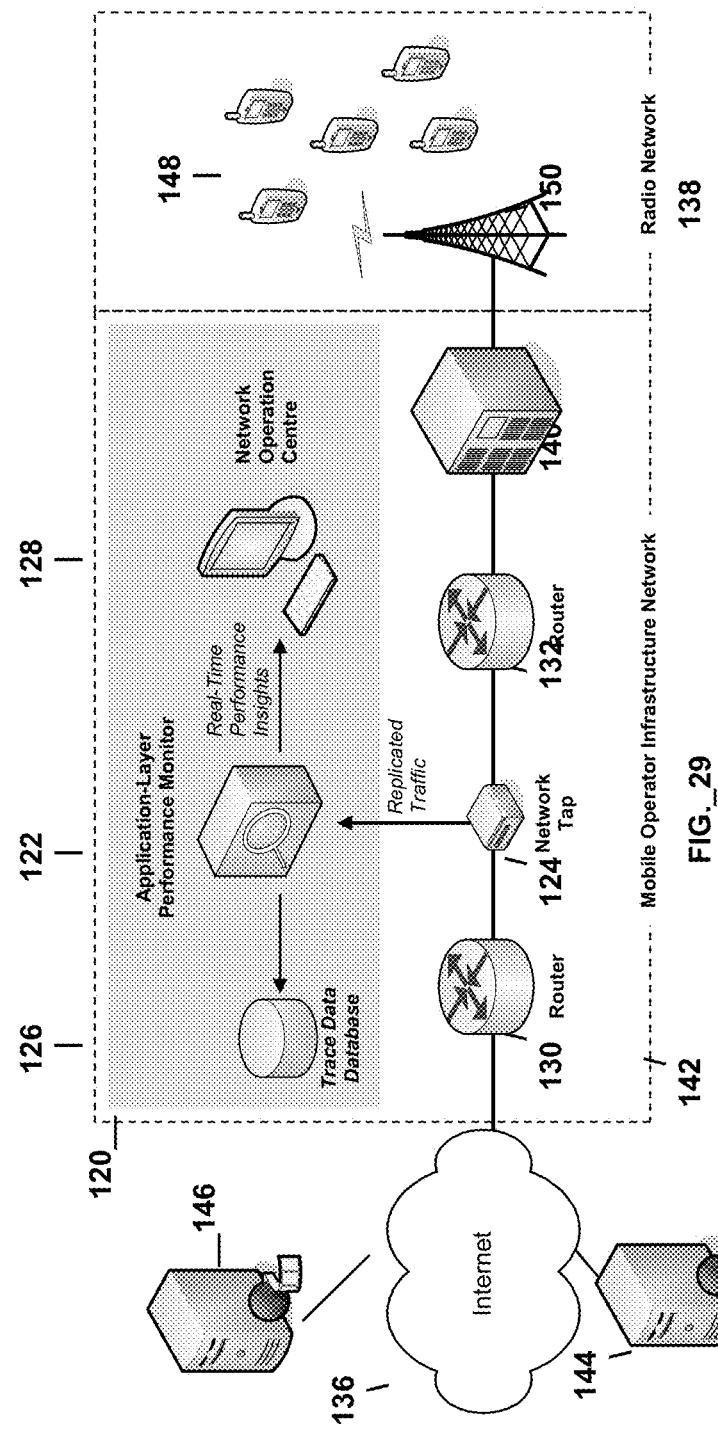
FIG._29

METHOD FOR LINK BUFFER SIZE AND QUEUE LENGTH ESTIMATION FOR BANDWIDTH-VARYING MOBILE DATA NETWORKS

CROSS-REFERENCES TO RELATED APPLICATIONS

The present application claims benefit under 35 USC 119 (e) of U.S. provisional Application No. 61/543,238, filed on Oct. 4, 2011, entitled "Method For Link Buffer Size and Queue Length Estimation For Bandwidth-Varying Mobile Data Networks," the content of which is incorporated herein by reference in its entirety.

STATEMENT AS TO RIGHTS TO INVENTIONS MADE UNDER FEDERALLY SPONSORED RESEARCH AND DEVELOPMENT

This work was not funded by any United States Federal Agency but was funded in part by the Innovation and Technology Fund (ITS/014/10) provided by the Innovation and Technology Commission, Hong Kong SAR, which does not claim proprietary interest in this invention.

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to wireless telecommunication and in particular to wireless mobile Internet digital data communication.

It is well known that the performance of Internet transport and application protocols depends heavily on the characteristics of the underlying network links, and in particular, the bottleneck link. Apart from the impact of competing traffics, a bottleneck link has three primary parameters, namely link bandwidth, buffer size, and queue length. Referring to citations listed below by the bracketed numerals, many previous works have investigated methods to estimate these link parameters, for example link bandwidth estimation [1-3], link buffer size estimation [4-6], and queue length estimation [7-9]. A common assumption among these previous works is that the link bandwidth is constant, which is largely valid for wired networks as the physical link typically has a fixed transmission data rate. However with the rapidly emerging mobile data networks such as 3G [10], HSPA [11], and LTE [12], this assumption is no longer valid.

To illustrate, FIG. 1 plots the measured bandwidth of a production 3G network over a time interval of 10 seconds where there is only a single UDP data flow going from a wired server to a 3G-connected receiver. It is evident that unlike fixed networks, mobile data network can exhibit significant bandwidth fluctuations over a short timescale (as well as over longer timescales, not shown here) even if there is no competing traffic destined to the same receiver. This poses a fundamental challenge to existing link property estimation algorithms as the assumption of fixed link bandwidth no longer holds.

Known algorithms for estimating the link buffer size are max-min [5-6] and loss-pair [6], and queue length estimations, used in TCP Vegas [7], Veno [9] and FAST TCP [8]. Consider the system model depicted in FIG. 2 where a single sender transmits packets via a bottleneck link to a receiver. None of the bottleneck link's parameters are known a priori and the propagation delays are constant. The goal is to estimate the queue length continuously, denoted by $q_i$, and link buffer size, denoted by L, at the sender via observation of the acknowledgement packet arrival times. Table I summarizes the notations used in the following discussions.

TABLE I

| Symbol | Description |
| --- | --- |
| $P_{d_1}$ | Propagation delay from sender to the link buffer |
| $P_{d_2}$ | Propagation delay from link buffer to the receiver |
| P | Total downlink propagation delay |
| U | Uplink delay |
| $q_i$ | Queuing delay of the $i^{th}$ packet |
| $q_{max}$ | Maximum queuing delay |
| $n_i$ | Number of packets queued-up at the link buffer when $i^{th}$ packet enters the buffer |
| S | Packet size |
| L | Link buffer size (including the one in service) |
| T | Transmission delay of the packet |
| C | Measured link capacity |
| $cwnd_i$ | Congestion window size of the $i^{th}$ packet |
| $rtt_i$ | Round-trip time of the $i^{th}$ packet |

Liu and Crovella [6] proposed the max-min method to estimate the link buffer size from the estimated transmission delay and the differences between maximum and minimum round-trip times (RTTs). Claypool et al. [5] further incorporated the max-min method into a measurement tool for use in access networks.

The principle of both max-min [5-6] and loss-pair [6] methods is to use RTT as a mean to measure the link buffer size. Specifically, let $P=P_{d1}+P_{d2}$ be the total downlink propagation delay, T be the transmission delay for one packet, and U be the uplink delay, which are all constant. Next let $q_i$ be the queuing delay experienced by packet i at the bottleneck link, and $n_i$ be the number of packets already queued-up at the bottleneck link buffer upon its arrival at the queue. Then RTT for packet i, denoted by $rtt_i$, can be computed from $$rtt_i = P + T + U + q_i \tag{1}$$

In a fixed-bandwidth link, the queuing delay of packet i is simply equal to the total time to de-queue the $n_i$ packets already in the queue plus the residual transmission time, denoted by $rtt_i$, for the packet already in service, i.e., $$q_i = n_i T = \delta \tag{2}$$

Given the link buffer size L, we have $n_i \leq L-1$. Also the residual transmission time is bounded by $\delta \leq T$. Therefore the maximum queuing delay, denoted by $q_{max}$, is given by $$q_{max} = \max\{(L-1)T + \delta\} \tag{3}$$
$$= LT$$

The minimum queuing delay is simply equal to zero when there is no packet inside the queue upon packet arrival. As the propagation and transmission delays are constant the maximum and minimum RTTs can be computed from $$rtt_{max} = P + T + U + q_{max} \tag{4}$$

$$rtt_{min} = P + T + U \tag{5}$$

Substituting (3) and (5) into (4), we have $$rtt_{max} = rtt_{min} + LT \tag{6}$$

Similarly, substituting (2) and (5) into (1), yields $$rtt_i = rtt_{min} + n_i T + \delta \quad (7)$$

Rearranging terms in (6), the link buffer size can be determined from [4], $$L = \frac{rtt_{max} - rtt_{min}}{T} \quad (8)$$

With knowledge of measured link capacity (C) and known packet size (S), the estimated transmission delay (T) can be computed from $$T = S/C \quad (9)$$

and the link buffer size is determined accordingly by $$L = \frac{(rtt_{max} - rtt_{min})C}{S} \quad (10)$$

The max-min method [5-6] is designed for active estimation where the sender sends a series of measurement packets through the bottleneck link at a rate higher than the link bandwidth to induce queue overflow. The receiver returns an acknowledgement (ACK) packet to the sender for every packet received. The sender can then measure the minimum RTT $rtt_{min}$, maximum RTT $rtt_{max}$, and link bandwidth C from the ACK packet arrival times. With S known the sender can compute L using (10). The estimation process can also be done by the receiver and the interested readers are referred to the work by Hirabaru [4] for more details.

From (10) it can be seen that the accuracy of the max-min method hinges upon the accuracy in measuring the three parameters, namely $rtt_{max}$, $rtt_{min}$, and C. In particular, if there is other cross traffic sharing the same bottleneck link, the RTT measurements will be modulated by the competing flows.

Liu and Crovella [6] tackled this problem in their improved loss-pair method. First, they only capture the RTTs of the two packets just before and after a loss event. This filters out samples not related to buffer overflow at the bottleneck link. Second, they analyze the distribution of the samples to determine their mathematical mode to further filter out noises due to cross traffic. These two techniques improved the accuracy of the loss-pair method.

Queue Length Estimation

There is no presently known measurement tool designed solely for queue length estimation purposes. Unlike link buffer size, which is a physical network property, queue length can vary from time to time depending on many parameters, including offered traffic load, traffic characteristic, link capacity, and so on. Therefore queue length measurement is meaningful only in the context of the actual data flow generated by the transport and/or application protocols.

Some TCP variants do implement algorithms to either implicitly or explicitly estimate the queue length at the bottleneck link for congestion control purpose. One well-known example is TCP Vegas [7] which employs an algorithm to estimate the queue length from the congestion window size and the difference between current and minimum round-trip times (RTTs). Similar algorithms have also been adopted in TCP Veno [9] and FAST TCP [8].

These queue-length estimation algorithms are inherently passive in that only the actual data and ACK packet timings are used for estimating the queue length. No extra measurement packets are generated in the process.

During operation, the TCP sender continuously measures the RTT, denoted by $rtt_i$, and records the congestion window size, denoted by $cwnd_i$, at the time ACK packet i is received. It then keeps track of the minimum $rtt_{min}$ by $$rtt_{min} = \min\{rtt_i | \forall i\} \quad (11)$$

and then computes the estimated queue length, denoted by $n'_i$, from the difference between the expected throughput, i.e., $cwnd_i \times rtt_{min}$, and the actual measured throughput, i.e., $cwnd_i \times rtt_i$, in the last round-trip time [7]:

$$n'_i = \frac{cwnd_i(rtt_i - rtt_{min})}{rtt_i} \quad (12)$$

One shortcoming of the Vegas method is that it uses the current congestion window size to estimate the queue length in the previous RTT. In case the congestion window size changes significantly from the last RTT, the estimation accuracy will suffer. This is why TCP Vegas only performs queue length estimation during the congestion avoidance phase where the congestion window size changes slowly.

FAST TCP [8] addressed this shortcoming by keeping track of the past congestion windows, and using the one at the time of the original data transmission instant to compute (12). This improves accuracy and also enables FAST TCP to estimate queue length during both slow-start and congestion avoidance phases.

Using a simulation, the inventors implemented max-min and loss-pair algorithms using UDP as the transport protocol and implemented the Vegas algorithm using TCP CUBIC (default congestion control in Linux) as the transport protocol, and conducted simulations using the network setup in FIG. 2.

In order to assist in evaluation, two performance metrics were defined, called absolute and relative link buffer size estimation errors, denoted by $E_A$ and $E_R$ respectively, to evaluate the algorithms' performance:

$$E_A = \text{estimated link buffer size} - \text{actual link buffer size} \quad (13)$$

$$E_R = \frac{E_A}{\text{actual link buffer size}} \times 100\% \quad (14)$$

FIG. 3 plots the estimation errors for max-min and loss-pair in active estimation for bottleneck link with buffer size ranging from 100 to 1000 packets. Not surprisingly the algorithms perform well in fixed-bandwidth networks. Their accuracies also improve as link buffer size increases (i.e., due to increases in the denominator of (14)).

Two queue-length estimation algorithms were implemented, namely the Vegas algorithm in TCP Vegas [7] and the FAST algorithm in FAST TCP [8], both using passive estimation. In addition, we also implemented the Vegas algorithm over TCP CUBIC [14]. In this case the TCP flow operates according to TCP CUBIC but the RTTs and congestion window size measurements are then fed into the Vegas algorithm to compute the estimated queue length. This special combination enables us to evaluate the performance of the Vegas estimation algorithm over one of the most widely deployed TCP variant in the Internet.

A relative queue length estimation error $Q_R$ and absolute queue length estimation error $Q_A$ were defined as the performance metric:

$$Q_A = \text{estimated queue length} - \text{actual queue length} \quad (15)$$

$$Q_R = \frac{\text{estimated queue length} - \text{actual queue length}}{\text{average queue length}} \times 100\% \quad (16)$$

FIG. 4 illustrates a comparison of relative queue length estimation errors in different TCP variants for fixed bottleneck link bandwidth. The plots are the estimation errors for the three cases for bottleneck link buffer size ranging from 100 to 1000 packets. There are two anomalies. First, FAST TCP achieved the best accuracy in all cases except the case with a link buffer size of 100 packets where the estimation error jumped to around 60%. This is due to the parameter settings in FAST TCP [8] which specifies the target number of inflight packets to maintain for the data flow. As the default value according to [8] is 100 packets it means FAST TCP will easily overflow the bottleneck link's buffer if the latter's size is close to or below the parameter value. As a result tuning of FAST TCP's parameter will have a significant impact on the performance of queue-length estimation.

Second, the results suggest that the Vegas algorithm when applied to a TCP Vegas flow in fact underperformed the same when applied to a TCP CUBIC flow. This is due to differences between the TCP Vegas and TCP CUBIC's congestion control algorithms. Specifically, TCP Vegas is designed to maintain a small number of packets (around 6 in our simulations) in the bottleneck link buffer. By contrast, TCP CUBIC is far more aggressive and in simulations TCP CUBIC maintained an average queue length at around 90% of link buffer size. Thus the larger denominator in (14) results in lower estimation errors for TCP CUBIC.

If the estimation error is compared in absolute number of packets as shown in FIG. 5 it can be seen that TCP CUBIC did exhibit higher absolute errors when compared to TCP Vegas and FAST TCP, especially for large link buffer sizes. This is because in TCP CUBIC, the congestion window grows faster for larger window sizes. Large link buffer size allows the congestion window to grow larger before buffer overflow occurs, thus causing higher estimation errors in computing (12) where the current congestion window size is used in place of the previous RTT's window size. FAST TCP does not suffer from this problem as it records the sequence of past window sizes and uses the correct one in computing (12), hence maintaining consistent estimation accuracy for a wide range of link buffer sizes.

As herein explained these tools can be used to evaluate the efficacy of the new methods according to the invention.

Citations used herein are as follows:

[1] A. Akella, S. Seshan, and A. Shaikh, "An Empirical Evaluation of Wide-Area Internet Bottlenecks," *Proceedings of the ACM Internet Measurement Conference (IMC)*, October 2003.
[2] K. Lakshminarayanan and V. Padmanabhan, "Some Findings on the Network Performance of Broadband Hosts," *Proceedings of the ACM Internet Measurement Conference (IMC)*, October 2003.
[3] V. Ribeiro, R. Riedi, R. Baraniuk, J. Navratil, and L. Cottrell, "pathChirp:Efficient Available Bandwidth Estimation for Network Paths," *PAM*, 2003.
[4] M. Hirabaru, "Impact of Bottleneck Queue Size on TCP Protocols and Its Measurement", *IEICE Transactions on Information and Systems*, vol. E89-D, No. 1, January 2006, pp. 132-138.
[5] M. Claypool, R. Kinicki, M. Li, J. Nichols, and H. Wu, "Inferring Queue Sizes in Access Networks by Active Measurement", *PAM,* 2004.
[6] J. Liu and M. Crovella, "Using Loss Pairs to Discover Network Properties", ACM *SIGCOMM Workshop on Internet Measurement*, pp. 127-138, 2001.
[7] L. S. Brakmo, S. W. O'Malley, and L. L. Peterson, "TCP Vegas: New techniques for congestion detection and avoidance," *Proceedings of the SIGCOMM '94*, London, U.K., October 1994, pp. 24-35
[8] S. Hegde, D. Lapsley, B. Wydrowski, J. Lindheim, D. Wei, C. Jin, S. Low, and H. Newman, "FAST TCP in High Speed Networks: An Experimental Study," *Proceeding of Grid-Nets*, October 2004.
[9] C. P. Fu, and S. C. Liew, "TCP Veno: TCP enhancement for wireless access networks," *IEEE Journal of Selected Areas in Communications*, vol. 21 no. 2, February 2003.
[10] V. K. Garg, Wireless Network Evolution: 2G to 3G, Prentice Hall PTR, Upper Saddle River, N.J., USA, 2001.
[11] E. Dahiman, S. Parkvall, J. Skold, P. Beming, 3*G Evolution: HSPA and LTE for Mobile Broadband*, $2^{nd}$ ed., Academic Press, 2008.
[12] D. Astely, E. Dahlman, A. Furuskar, Y. Jading, M. Lindstrom, and S. Parkvall, "LTE: The Evolution of Mobile Broadband", *IEEE Communications Magazine*, vol. 47(4), April 2009, pp. 44-51.
[13] K. Liu and J. Y. B. Lee, "Mobile Accelerator: A New Approach to Improve TCP Performance in Mobile Data Networks," *Proc. 7th IEEE International Wireless Communications and Mobile Computing Conference (IWCMC* 2011), Istanbul, Turkey, Jul. 5-8, 2011.
[14] A. B. Downey, "Using pathchar to estimate internet link characteristics," *Proceedings of ACM SIGCOMM* 1999, August 1999.
[15] S. Ha, I. Rhee and L. Xu, "CUBIC: A New TCP-Friendly High-Speed TCP Variant," *International Workshop on Protocols for Fast and Long Distance Networks*, 2005.
[16] NS2, Network Simulator, http://www.isi.edu/nsnam/ns/.
[17] S. Floyd, J. Mandavi, M. Mathis, and M. Podolsky, *An extension to the selective acknowledgement (SACK) option for TCP, Request for Comments* 2883, 2000.
[18] FAST TCP ns2 module, http://www.cubinlab.ee.unimelb.edu.au/ns2FASTtcp/
[19] O. Ait Hellal, E. Altman "Problems in TCP Vegas and TCP Reno", *DNAC Cong. (De Nouvelles Architectures pourles Communications*), UVSQ, Paris, Dec. 3-5, 1996.
[20 S. Mascolo, C. Casetti, M. Geria, M. Y. Sanadidi and R. Wang, "*TCP Westwood: Bandwidth Estimation for Enhanced Transport over Wireless Links*," in Proceedings of ACM SIGMOBILE, July 2001.
[21] Apache, http://www.apache.org/
[22] Wget, http://gnuwin32.sourceforge.net/packages/wget.htm
[23] Wireshark, http://www.wireshark.org/

SUMMARY

According to the invention, a method is provided using a sum-of-delays algorithm in a digital mobile communication bandwidth-varying network to estimate link buffer size and queue length in an underlying network connection. In particular embodiments, the sum-of-delays algorithm is implemented using both active estimation and passive estimation. Mechanisms associated with the process compensate for link bandwidth variations. The invention can accurately estimate link buffer size under varying bandwidth conditions such as wireless networks and outperform conventional techniques under both fixed and varying bandwidth conditions by multiple orders of magnitude.

In a particular embodiment, passive estimation is employed to implement the process by simply measuring the in-band data packet timings to perform estimation, thus eliminating the need for transmission of extra measurement packets. This method enables the integration of the link buffer size estimation algorithm into existing transport protocols such as TCP to optimize congestion controls. As part of the invention, a new congestion control method called TCP Queue-length-Adaptive (TCP-QA) is developed to employ the sum-of-delays algorithm in the TCP sender computer to control the data flow in a TCP connection. Compared to existing TCP variants, TCP-QA can achieve significantly better network bandwidth utilization in bandwidth-varying networks.

An accurate estimation of link buffer size has a number of significant advantages. First, transport protocols such as TCP are originally designed for wired networks of which the link buffer size is often small (e.g., in the order of tens of kilobytes per port). This is no longer the case in mobile data networks where the buffer size is often in hundreds of kilobytes and as such, TCP often perform sub-optimally in mobile data networks. Therefore knowledge of the link buffer size will enable the development of a new generation of TCP variants optimized for mobile data networks.

Second, many application protocols employ feedback from receivers to regulate the traffic flow. The existence of a large link buffer may introduce substantial delay to the feedback and potentially cause stability problems in closed-loop control protocols. Knowledge of the link buffer size will enable these protocols to compensate for the extra delays and ensure stable operation over mobile data networks.

Third, the ability to estimate queue length at the bottleneck link opens up a new way for mobile operators to monitor the performance of their subscribers and cell sites. Due to a mobile network's inherent bandwidth fluctuations, queue length is potentially more accurate in reflecting the utilization and level of congestion experienced by a mobile subscriber as compared to link/transport layer throughput measurements.

The invention will be better understood by reference to the following detailed description in connection with the accompanying drawings.

BRIEF DESCRIPTION OF THE DRAWINGS

FIG. 1 is timing diagram illustrating measured bandwidth of the prior art.

FIG. 2 is a block diagram illustrating a system model for link buffer size estimation of the prior art.

FIG. 3 is a chart showing comparison of estimation errors for fixed bottleneck link bandwidth.

FIG. 4 is a chart showing queue length estimation errors in various TCP variant for fixed bottleneck link bandwidth.

FIG. 5 is a chart showing comparison of absolute queue length deviation in queue length estimations algorithms in different TCP variants for fixed bottleneck link bandwidth.

FIG. 6 is a chart showing comparison of relative link buffer size estimation errors for varying bottleneck link bandwidth, where L is the actual ink buffer size.

FIG. 7 is a chart showing comparison of relative queue length estimation errors in different TCP variants for varying bottleneck link bandwidth.

FIG. 8 is a chart showing comparison of absolute queue length deviation in queue length estimations algorithms in different TCP variants for varying bottleneck link bandwidth.

FIG. 9 is a block diagram illustrating a system model under which the effect of bottleneck link bandwidth variation is incorporated into link buffer size estimation.

FIG. 10 is a chart showing comparison of estimation errors for active estimation with fixed bottleneck link bandwidth.

FIG. 11 is a chart showing comparison of estimation errors for passive estimation with fixed bottleneck link bandwidth.

FIG. 12 is a chart showing comparison of estimation errors for active estimation with varying bottleneck link bandwidth in accordance with the invention.

FIG. 13 is a chart showing comparison of estimation errors for passive estimation with varying bottleneck link bandwidth in accordance with the invention.

FIG. 14 is a chart showing comparison of relative queue length estimation errors in various TCP variants with fixed bottleneck link bandwidth.

FIG. 15 is a chart showing comparison of absolute queue length estimation in queue length estimation algorithms in various TCP variants for fixed bottleneck link bandwidth.

FIG. 16 is a chart showing relative queue length estimation errors in various TCP variants with varying bottleneck link bandwidth.

FIG. 17 is a chart showing absolute queue length estimation errors in various TCP variants with varying bottleneck link bandwidth.

FIG. 18a is a chart showing comparison of estimation errors versus estimation duration for active estimation with fixed bottleneck link bandwidth of 0.8 Mbps.

FIG. 18b is a chart showing comparison of estimation errors versus estimation duration for active estimation with fixed bottleneck link bandwidth of 4.8 Mbps.

FIG. 18c is a chart showing comparison of estimation errors versus estimation duration for active estimation with fixed bottleneck link bandwidth of 7.2 Mbps.

FIG. 19a is a chart showing comparison of estimation errors versus estimation duration for passive estimation with fixed bottleneck link bandwidth of 0.8 Mbps.

FIG. 19b is a chart showing comparison of estimation errors versus estimation duration for passive estimation with fixed bottleneck link bandwidth of 4.8 Mbps.

FIG. 19c is a chart showing comparison of estimation errors versus estimation duration for passive estimation with fixed bottleneck link bandwidth of 7.2 Mbps.

FIG. 20 is a chart showing comparison of estimation errors versus estimation duration for active estimation with varying bottleneck link bandwidth.

FIG. 21 is a chart showing comparison of estimation errors versus estimation duration for passive estimation with varying bottleneck link bandwidth.

FIG. 28 is a functional block diagram of a system implementing a sum of delays technique in an application program.

FIG. 29 is a high level block diagram of a data communication system with mobile wireless devices and Internet communication showing a mobile operating system infrastructure network having a passive, real-time network monitoring device according to the invention.

DETAILED DESCRIPTION OF THE INVENTION

Figure 22:
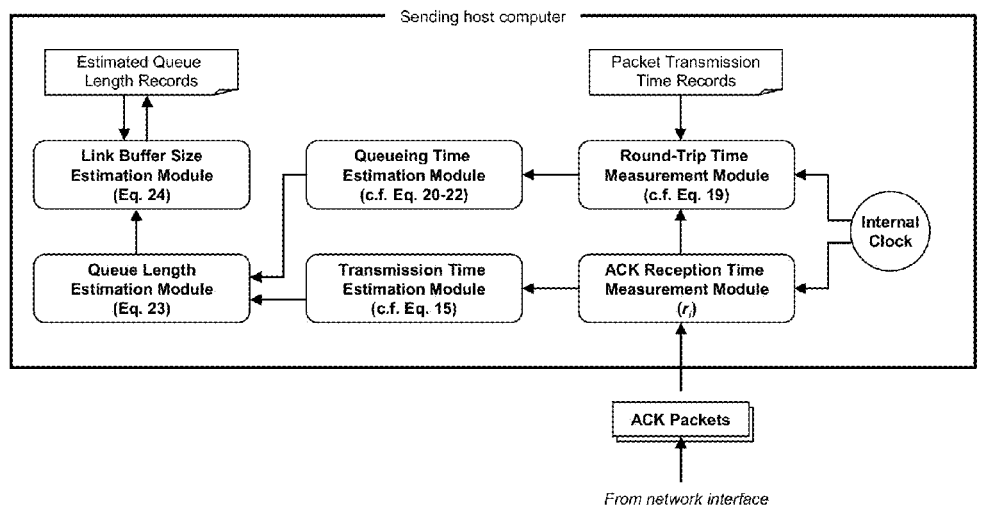
FIG. 22 is a block diagram of an apparatus for performing a sum of delays technique at a sending host computer according to the invention.

To incorporate the effect of bandwidth variations in estimating the link buffer size and queue length, it is necessary to identify a means whereby the effect can be measured indirectly and subsequently incorporated into the estimation model.

FIG. 9 depicts the revised network model for a network with varying bottleneck link bandwidth. Variations in the link bandwidth will manifest as variations in packet transmission time. Specifically, the packet transmission time is equal to the packet size divided by the average bandwidth when the packet is transmitted by the bottleneck link. Let $t_i$ be the transmission time for packet i, then one can incorporate the effect of bandwidth variations through the series $\{t_i\}$, which can be computed from the measured ACK packet inter-arrival times for packets i and (i−1), denoted by $r_i$ and $r_{i-1}$ respectively:

$$t_i = r_i - r_{i-1} \quad (17)$$

provided that the link does not become idle during this time.

Consider the scenario when packet i arrives at the bottleneck link to find that there are $n_i$ packets already queuing, plus packet $(i-n_i-1)$ currently being transmitted. Then the queuing delay of packet i, denoted by $q_i$, is equal to the total time to de-queue all $n_i$ packets, i.e., the summation of transmission delays of packet (i−1) to $(i-n_i)$, plus the residual time to transmit packet $(i-n_i-1)$, denoted by $\delta_i$:

$$q_i = t_{i-1} + t_{i-2} + \ldots + t_{i-n_i} + \delta_i \quad (18)$$

The residual transmission time $\delta_i$ is bounded from above by the packet's transmission delay and bounded from below by zero, i.e., $$0 \leq \delta_i \leq t_{i-n_i-1} \quad (19)$$

Substituting the bounds of (19) into (18), we can then obtain the corresponding bounds for $q_i$:

$$t_{i-1} + t_{i-2} + \ldots + t_{i-n_i} \leq q_i \leq t_{i-1} + t_{i-2} + \ldots + t_{i-n_i} + t_{i-n_i-1} \quad (20)$$

or $$\sum_{k=i-n_i}^{i-1} t_k \leq q_i \leq \sum_{k=i-n_i-1}^{i-1} t_k$$

Now the transmission delays $\{t_k\}$ can be computed from the measured ACK packet inter-arrival times using (17). To determine $n_i$, which is the queue length at the time packet i arrives at the bottleneck link, one must first find $q_1$.

Obviously the queuing time $q_i$ cannot be measured directly due to bandwidth variations. However it is possible to obtain a lower bound for $q_1$.

Specifically, consider the RTT for packet i as measured by the sender:

$$rtt_i = q_i + t_i + U + P_{d_1} + P_{d_2} \quad (21)$$

and the minimum RTT measured will be equal to $$rtt_{min} = \min\{q_i + t_i | \forall i\} + U + P_{d_1} + P_{d_2} \quad (22)$$

Subtracting (22) from (21) yields $$rtt_i - rtt_{min} = q_i + t_i - \min\{q_i + t_i | \forall i\} < q_i + t_i : q_i \leq 0, t_i > 0 \quad (23)$$

Rearranging terms then there is a lower bound for $q_1$:

$$q_i > rtt_i - rtt_{min} - t_i \quad (24)$$

This lower bound must satisfy the upper bound in (20), hence one may increase the value of $n_i$ in (20) until its R.H.S. becomes larger than the lower bound in (24):

$$n'_i = \min\left\{ n_i \left| \sum_{k=i-n_i-1}^{i-1} t_k > (rtt_i - rtt_{min} - t_i), \forall n_i = 0, 1, \ldots \right.\right\} \quad (25)$$

The smallest $n_i$ that satisfies both bounds then become the estimated queue length $n'_i$. The link buffer size can then be computed from the maximum of all queue length estimates:

$$L' = \max\{n'_i | \forall i\} + 1 \quad (26)$$

It is worth noting that the above estimation method is an approximation and thus could overestimate or underestimate the link buffer size. Estimation accuracy is evaluated herein after.

Application of Invention to Transport Protocols

The sum-of-delays method needs to be implemented and integrated into a transport or application protocol to take advantage of the link buffer size and queue length information in network traffic controls such as congestion control or traffic routing. This section explores two general approaches to achieving that, namely active estimation and passive estimation.

Figure 23:
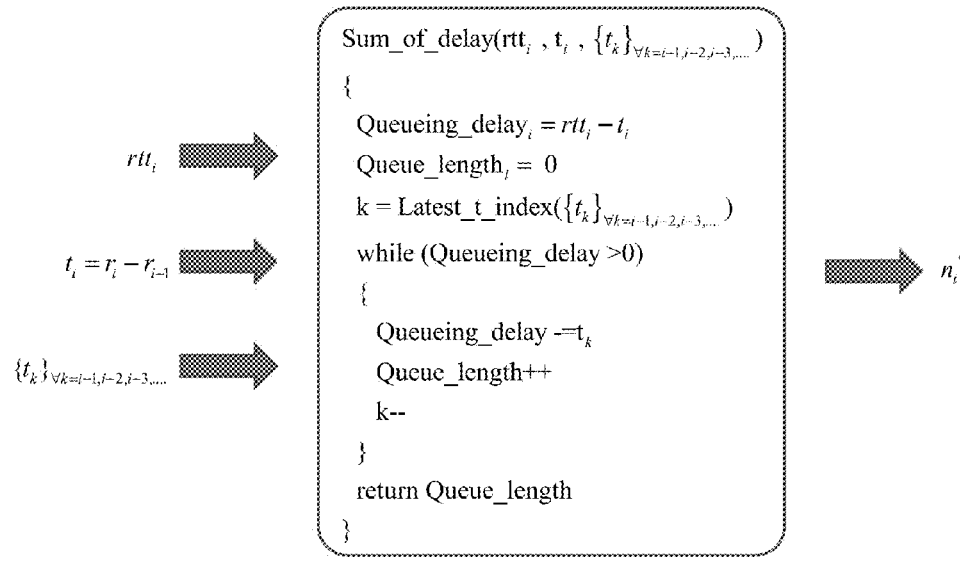
FIG. 23 is a pseudo-code listing of a sum of delays algorithm.

In both cases two measured parameters are required: the packets' transmission delay and the round-trip time. The former can be computed from the ACK packets inter-arrival times while the latter can be computed from the difference between a packet's transmission time and its ACK reception time. A simplified pseudo-code of sum-of-delay algorithm is summarized in FIG. 23, and an apparatus that implements the method is depicted in FIG. 22. Referring to FIG. 22, the components are implemented in the sending host computer to respond to ACK packets from the network interface. Operating under control of an internal clock, an ACK reception time measurement module measures $r_i$ and communicates it to a transmission time estimation module to perform equation 17 the results of which are provided as one input to a queue length estimation module. Using packet transmission time records, a round-trip time measurement module performs equation 21 and provides its results to a queuing time estimation module that performs according to equations 22-24, providing its output as a second input to the queue length estimation module which processes its inputs according to equation 25. The result is provided to a link buffer size estimation module executing equation 26, with results being the estimated queue length records in accordance with the invention.

Active Estimation

Figure 24:
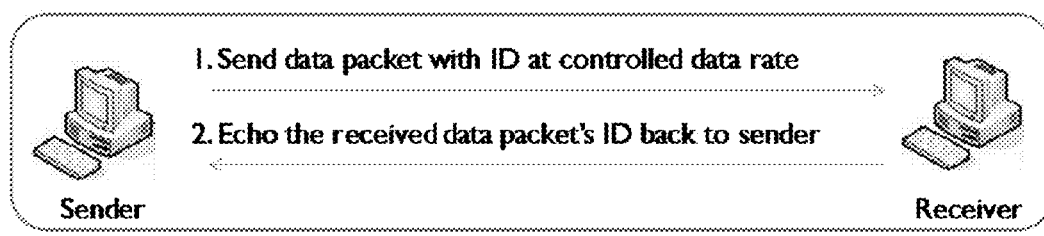
FIG. 24 is a block diagram of an active estimation system.

In active estimation, the system, as shown in FIG. 24, can generate and transmit explicit measurement packets at a controlled transmission rate to facilitate link buffer size estimation. Specifically, as discussed above the accuracy of the transmission delay computation depends on the assumption that the bottleneck link does not become idle during the measurement period or the link buffer size may be underestimated.

As active estimation allows the sender to control the transmission rate directly simply by generating measurement packets at the desired data-rate we can satisfy the assumption by either sending measurement packets at a sufficiently high data-rate or progressively increasing the sending rate until queue overflow occurs at the bottleneck link. Note that this will require the use of UDP as the underlying transport as TCP's built-in flow and congestion control modules will interfere with the sending rate control. At the receiver side it will need to generate and send back an ACK packet for every measurement packet received so that the sender can compute the two measured parameters.

In practice, active estimation will be more suitable for use in network measurement tools to measure link buffer size as the choice of transport protocol and the generation of explicit measurement traffics can be easily supported.

Passive Estimation

Figure 25:
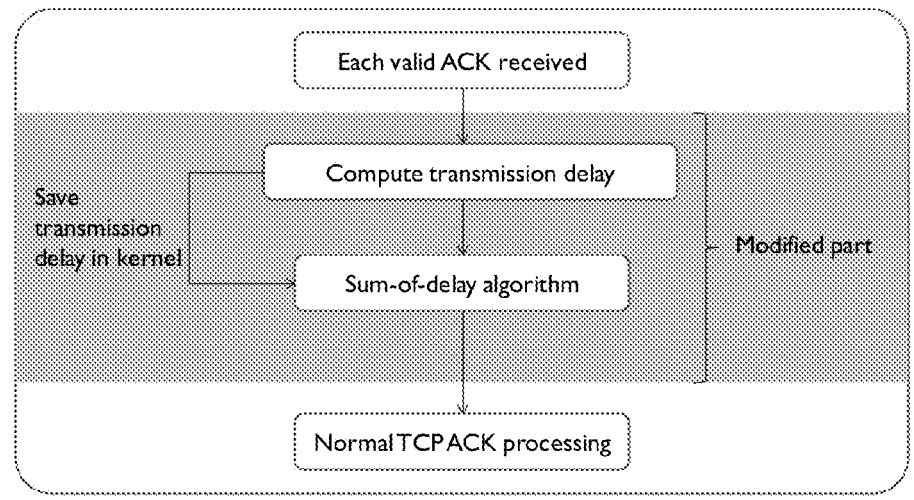
FIG. 25 is a depiction of a modified LINUX kernel in a method for passive estimation of sum-of-delays.

In passive estimation the system is designed to not generate any explicit measurement packets but instead it is designed to rely on measurements of the delivery of normal data packets. The estimation process could be incorporated into Linux kernel implementation, as shown in FIG. 25. The only modification is to compute transmission delay (Step A), save it in the kernel (Step B) and compute the estimated queue length using sum-of-delay module once a valid ACK is received (Step C). This approach is most suitable for integration with existing applications such as video streaming where modification to the client software is not always practical or when the transport protocol is limited to TCP.

The primary challenge in passive estimation is the lack of control on the data sending rate. In the case of TCP as an example, its built-in flow and congestion control algorithms limit the sending rate subject to client and network conditions. In case of packet loss, for example, TCP's sending rate will drop significantly, thereby affecting the measurement accuracy of the packet transmission delays $\{t_i\}$ in (17).

There are two ways to tackle this problem. First, as the sender can identify congestion events via duplicate ACKs in TCP, it can filter out the measurement samples during TCP's congestion recovery phase. Second, the TCP's congestion control algorithm could be modified to accommodate explicit control of the sending rate to improve measurement accuracy.

Implementations of Sum of Delays Systems and Methods

The Sum of Delays (SoD) technique according to the invention can be implemented in systems in a variety of ways, including but not limited to part of a transport protocol (e.g., TCP) in an operating system, part of an Application Programming Interface (API) in an operating system, part of an Internet application in either a client or a server or both, and part of a passive network monitoring device that monitors network traffic via a tapping device.

Figure 27:
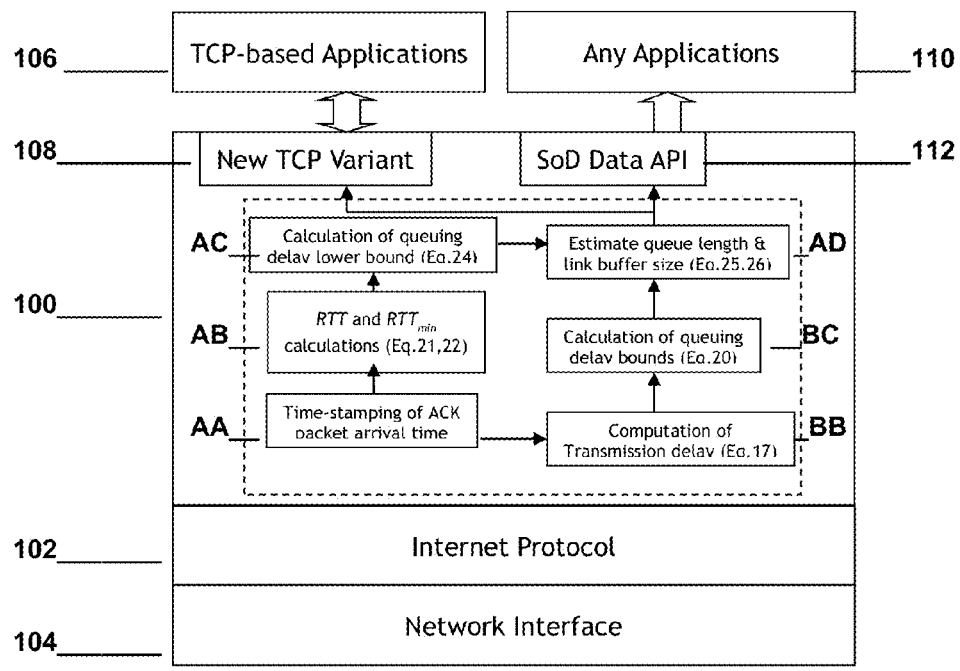
FIG. 27 is a functional block diagram of a system implementing a sum of delays technique in an operating system.

Referring to FIG. 27 as illustrative, the inventive SoD technique 100 may be incorporated in an operating system as part of the kernel, such as a Linux kernel, between the Internet Protocol (IP) 102 that communicates through the Network Interface (NI) 104 and TCP-based applications 106 through a TCP variant 108.) Alternatively, it may be implemented as a part of the operating system to communicate with other applications 110 through an SoD Data API 112. The specific steps implementing both the operating system techniques involve time-tamping of ACK packet arrival time (Step AA) and then performing calculations in accordance with Equations 21, 21 and 24 (Steps AB, AC) and with Equations 17 and 20 (Steps BB, BC) to provide the input for estimating queue length and link buffer size according to Equations 25 and 26 (Step AD). The results are applied to the target TCP-based or to non-TCP-based applications.

As a further alternative, referring to FIG. 28, the SoD technique may be implemented as an element of an application program communicating via an application-specific protocol 114 that runs atop The Internet Protocol (IP) or UDP over IP (116) which in turn runs on the Network Interface 104. The steps of the application-based technique are substantially the same as with the operating system implementation, as well as part of a passive network monitoring device. The outputs are estimates of a bottleneck's link buffer size and on-going queue length.

Referring to FIG. 29, SoD implementation is shown as part of a passive network monitoring device 120. An Application Layer Performance Monitor 122 performs the techniques of either FIG. 28 or FIG. 27, receiving data through a network tap 124 and storing the outputs in a trace data dataset 126 while proving real-time performance insights based on the outputs to a network operating center 128. The network tap 124 is disposed between routers 130, 132 that route packets between the Internet 136 and a wireless network 138 through a transceiver interface 140. In this manner a mobile operator infrastructure network 142 bridges between the Internet 136 with various servers 144, 146 and mobile phones 148 communicating with a wireless access point 150.

Uses of Sum-of-Delays Algorithm

The Sum-of-Delays algorithm according to the invention has been shown to have accurate performance in queue length and link buffer size estimation in the network. Apart from link buffer size estimation, the proposed algorithm could also be used to continuously estimate the queue length of a TCP flow to estimate its resources consumption in the network buffer. In this way, we could evaluate and analyze the performance of different TCP variants under different network environments. These information are useful in improving the performance of TCP variants under different scenario, for example, we could set a target queue length occupancy high enough to improve network utilization, especially in bandwidth-varying network links, but not excessively high such that link buffer overflow will occur. This enables the TCP sender to better control the transmission rates to increase bandwidth utilization in bandwidth-varying networks, where traditional TCP congestion controls will be either too aggressive (which causes link buffer overflow) or too conservative (which results in poor bandwidth utilization).

A novel transport protocol called TCP Queue-length-Adaptive (TCP-QA) has been implemented that demonstrates one way to incorporate the sum-of-delay methods to continuously estimate queue length for the purpose of transmission rate control and congestion control.

TCP Queue-Length Adaptive (TCP-QA)

TCP was developed many decades ago and have since evolved over the years. Nonetheless its design is still based on a fixed-network model where link bandwidth is relatively constant, and link buffer sizes are relatively small. These assumptions, however, are no longer valid in mobile and wireless networks where link bandwidth variation is the norm rather than the exception. Moreover, because of the much higher bit-error rates in wireless networks most of them implement error control in the link layer, and as a result, they need to maintain a relatively large link buffer in order to enable link-layer error control. Finally, even link-layer error control may not be able to recover all transmission errors and thus non-congestion-induced packet losses are common in wireless networks.

All these factors negatively impact the performance of conventional TCP in wireless networks. These and other challenges are addressed by the proposed TCP-QA protocol described below. It is worth noting that TCP-QA only requires modification to the TCP sender. It is compatible with the conventional TCP receivers in existence.

Figure 26:
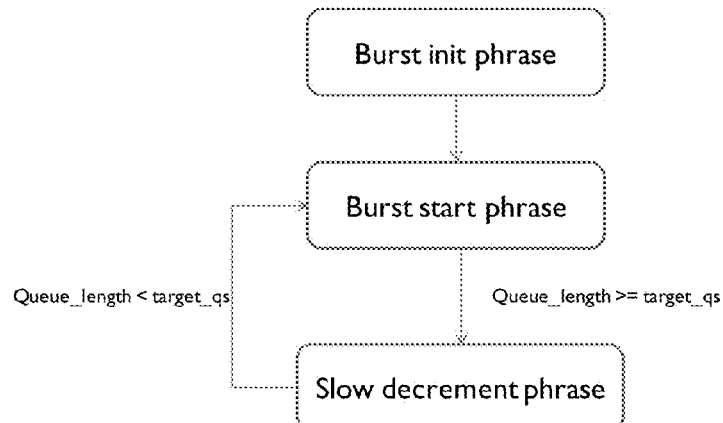
FIG. 26 is a flow chart of core TCP-QA procedures.

TCP-QA comprises three phases: burst-start phase, slow-decrement phase, burst-init phase. The first two phases take place inside the original congestion avoidance phase and slow-start phase of TCP. The third phase would only operate at the start of the TCP variant. The principle of TCP-QA is to adjust the sending rate according to the queue length estimated by a queue-length estimation algorithm such as the sum-of-delays algorithm, with a configurable target queue length (denoted by target_qs) to control the number of packets to be queued up at the network buffer. This target queue length is tunable and is to be adjusted according to the underlying network property. The value of the target queue length should be smaller than the link buffer size of the network to prevent congestion. The physical impact of this parameter is to maintain sufficient number packets in the bottleneck link's buffer such that when bandwidth varies (e.g., upwards), there will be sufficient packets available in the buffer to utilize the available bandwidth, thus preventing the bottleneck link from idling (which wastes bandwidth). The pseudo-code for one particular embodiment of TCP-QA is listed below, with TCP_QA_CA( ) being the congestion control module which controls the transmission rate; TCP_QA_SSTH( ) being the module for reacting to packet loss events; TCP_QA_INIT( ) being the burst-init phase which executes once at the beginning of the TCP flow. The variable Queue_length represents the current queue length at the bottleneck link as estimated using a queue-length estimation algorithm such as the sum-of-delays algorithm. A flow chart of the TCP-QA procedures is summarized in FIG. 26. These pseudo-codes and flow chart serve to illustrate one possible application of queue-length information to congestion control in transport protocols such as TCP. The pseudo-code for TCP_QA_CA( ) sets forth specific steps for the congestion control method, including the initialization phase (TCP_QA_INIT( )), the congestion avoidance phase (TCP_QA_CA( )), and the updating of the slow-start threshold (TCP_QA_SSTH( )). This has been implemented in Linux and tested in real networks.

| Pseudo-code of TCP-QA module. | |
|---|---|
| TCP_QA_CA() { if (Queue_length < target_qs) //burst start phrase cwnd=cwnd+1 else { //slow decrement phrase cwnd = cwnd − $\frac{1}{cwnd}$ } } | TCP_QA_SSTH() { if(packet_loss_event) { if (Queue_length > target_qs) cwnd = cwnd / 2 } } TCP_QA_INIT() { // burst init phrase if (burst_start_enabled) cwnd = min(awnd, 64) } |

Burst-init phase (TCP_QA_INIT) in TCP-QA allows TCP connection to grow at a higher sending rate but not overflowing the receiver buffer size. During burst-start phase as long as the estimated queue length is lower than the target threshold (i.e., target_qs), it would undergo burst-start phase to aggressively increase its sending rate until the queue length exceeds the target value (c.f. the 'if' part of TCP_QA_CA). After that, it would undergo slow-decrement phase to gradually decrease its sending rate until the queue length reach the target value (c.f. the 'else' part of TCP_QA_CA) and go to burst-start phase again. When loss events occur, it would determine the sending rate depending on the queue length information to prevent unnecessary sending rate reduction because of random loss (c.f. TCP_QA_SSTH).

TCP-QA can be implemented as a pluggable module inside a modified kernel in FIG. 10. In this case it is compatible with the existing congestion control module interface inside Linux kernel.

Performance Evaluation

As part of the invention an extensive simulation was undertaken as mentioned herein above and a performance evaluation was undertaken with results reported in peer-reviewed journals. For the sake of completeness, the results of this evaluation are included herein.

The estimation accuracy of SoD has been compared with existing algorithms using a simulator implemented using NS2 [16]. It is worth noting that while NS2 already has built-in TCP implementations, their implementations do deviate from the actual TCP implementations used in the Internet today in important ways. Therefore the simulator was implemented based on actual TCP implementations in current Linux kernels and was also implemented with widely-deployed optional TCP features such as TCP SACK [17] to establish a more realistic platform for the simulations.

TABLE II

| Parameters | Value | Description |
|---|---|---|
| $P_{d_1}$ | 10 ms | Propagation delay from sender to bottleneck link |
| $P_{d_2}$ | 70 ms | Propagation delay from bottleneck link to receiver |
| U | 80 ms | Propagation delay from receiver to sender |
| L | 100 to 1000 | Bottleneck link buffer size |
| C | 0.8-7.2 Mbps | For fixed bandwidth case |
| T | 100 s | Simulation Duration |
| # of runs | 10 | Number of simulation runs averaged per data point |
| Loss rate | 0% | Packet loss rate |

The simulated network topology is as depicted in FIG. 9, and Table II summarizes the simulation parameters. For passive estimation, TCP was employed as the transport and the sender simply sent data as fast as TCP allowed. The TCP CUBIC [14] kernel module from Linux 2.6 was incorporated into the simulator as it is one of the most widely used TCP variant in use in the Internet. Additionally, TCP SACK [17] was implemented in the simulator to more accurately model real TCP behavior. For comparison purposes SoD over TCP Vegas [7] was implemented by incorporating its Linux kernel model into NS2.

Finally, as the open source Linux kernel does not currently implement FAST TCP, the FAST TCP NS2 module developed by the CUBIN Lab [18] was employed in these simulations.

Link Buffer Size Estimation in Fixed Bandwidth Networks

First consider the baseline case of estimating link buffer size in a network with fixed bottleneck link bandwidth using active estimation. Table III and FIG. 10 compare the estimation error of max-min, loss-pair, and sum-of-delays algorithms. Not surprisingly both max-min and loss-pair performed well in this setup, with estimation errors below 2% in all cases. The inventive sum-of-delays method achieved very accurate estimation with zero error (to two decimal places). Moreover, its accuracy is consistent across all link buffer sizes, as opposed to max-min/loss-pair where the estimation error increases with smaller link buffer sizes.

TABLE III

| | Max-Min (%) | | Loss-Pair (%) | | Sum-of-Delays (%) | |
|---|---|---|---|---|---|---|
| L | E | stdev | E | stdev | E | stdev |
| 100 | −1.00 | 0.00 | −1.26 | 0.15 | 0.00 | 0.00 |
| 200 | −0.50 | 0.01 | −0.63 | 0.08 | 0.00 | 0.00 |
| 300 | −0.33 | 0.00 | −0.41 | 0.04 | 0.00 | 0.00 |
| 400 | −0.25 | 0.00 | −0.30 | 0.04 | 0.00 | 0.00 |
| 500 | −0.20 | 0.00 | −0.24 | 0.03 | 0.00 | 0.00 |

TABLE III-continued

| | Max-Min (%) | | Loss-Pair (%) | | Sum-of-Delays (%) | |
|---|---|---|---|---|---|---|
| L | E | stdev | E | stdev | E | stdev |
| 600 | −0.16 | 0.00 | −0.21 | 0.03 | 0.00 | 0.00 |
| 700 | −0.14 | 0.00 | −0.17 | 0.02 | 0.00 | 0.00 |
| 800 | −0.12 | 0.00 | −0.15 | 0.02 | 0.00 | 0.00 |
| 900 | −0.11 | 0.00 | −0.13 | 0.02 | 0.00 | 0.00 |
| 1000 | −0.10 | 0.00 | −0.12 | 0.02 | 0.00 | 0.00 |

Next passive estimation was investigated where no explicit measurement packets are generated. The estimation was computed solely from the timings of normal data packets which are controlled and scheduled according to TCP CUBIC's flow and congestion control algorithms. While this is not the original intended applications for max-min/loss pair, the results in Table IV and FIG. 11 show that their performances were not significantly worse than their fixed-bandwidth counterparts. The proposed SoD algorithm still outperformed max-min/loss-pair for most of the link buffer size ranges (e.g., from 300 to 1000).

TABLE IV

| | Max-Min (%) | | Loss-Pair (%) | | Sum-of-Delays (%) | |
|---|---|---|---|---|---|---|
| L | E | stdev | E | stdev | E | stdev |
| 100 | 0.72 | 1.03 | −1.30 | 0.35 | 0.33 | 0.50 |
| 200 | −0.07 | 0.47 | −1.00 | 0.27 | 0.56 | 0.53 |
| 300 | −0.32 | 0.35 | −0.94 | 0.25 | 0.22 | 0.33 |
| 400 | −0.41 | 0.22 | −0.89 | 0.24 | 0.14 | 0.18 |
| 500 | −0.47 | 0.15 | −0.86 | 0.22 | 0.09 | 0.15 |
| 600 | −0.51 | 0.16 | −0.82 | 0.22 | 0.15 | 0.15 |
| 700 | −0.51 | 0.10 | −0.77 | 0.20 | 0.08 | 0.14 |
| 800 | −0.48 | 0.05 | −0.69 | 0.16 | 0.07 | 0.17 |
| 900 | −0.58 | 0.15 | −0.79 | 0.23 | 0.07 | 0.11 |
| 1000 | −0.62 | 0.18 | −0.75 | 0.22 | 0.03 | 0.05 |

Link Buffer Size Estimation in Variable Bandwidth Networks

Bandwidth-varying network simulation runs comprised ten sets of actual bandwidth trace data obtained from a production 3G/HSPA network to modulate the bandwidth of the bottleneck link in FIG. 9. The trace data were captured at a mobile computer connected to a 3G/HSPA network using a USB 3G/HSPA modem. The client computer remained stationary during the trace capture process. Thus it did not incorporate the effect of mobility-induced bandwidth fluctuations.

Table V and Table VI compare the mean and standard deviation of the estimation errors of the three estimation algorithms under active and passive estimations respectively. The results are also presented visually in FIG. 12 and FIG. 13, with the standard deviation indicated by the error bars.

TABLE V

| | Max-Min (%) | | Loss-Pair (%) | | Sum-of-Delays (%) | |
|---|---|---|---|---|---|---|
| L | E | stdev | E | stdev | E | stdev |
| 100 | 133.70 | 63.03 | −8.39 | 8.29 | 0.00 | 0.00 |
| 200 | 105.54 | 64.66 | −8.38 | 7.43 | 0.00 | 0.00 |
| 300 | 90.94 | 59.46 | −7.66 | 6.47 | 0.00 | 0.00 |
| 400 | 79.28 | 53.64 | −9.13 | 8.02 | 0.00 | 0.00 |
| 500 | 71.33 | 47.68 | −11.21 | 9.10 | 0.00 | 0.00 |
| 600 | 64.15 | 42.81 | −7.25 | 5.17 | 0.00 | 0.00 |
| 700 | 57.60 | 38.24 | −5.58 | 4.93 | 0.00 | 0.00 |
| 800 | 52.47 | 33.56 | −8.59 | 8.74 | 0.00 | 0.00 |
| 900 | 48.12 | 29.77 | −7.31 | 7.54 | 0.00 | 0.00 |
| 1000 | 44.20 | 26.68 | −7.51 | 7.51 | 0.00 | 0.00 |

TABLE VI

| | Max-Min (%) | | Loss-Pair (%) | | Sum-of-Delays (%) | |
|---|---|---|---|---|---|---|
| L | E | stdev | E | stdev | E | stdev |
| 100 | 136.93 | 90.43 | −11.96 | 12.57 | 0.80 | 0.42 |
| 200 | 115.74 | 82.12 | −15.96 | 14.95 | 0.35 | 0.24 |
| 300 | 110.24 | 80.55 | −20.01 | 12.72 | 0.37 | 0.33 |
| 400 | 94.25 | 71.36 | −20.6 | 12.38 | 0.23 | 0.28 |
| 500 | 83.86 | 67.03 | −14.11 | 11.62 | 0.16 | 0.18 |
| 600 | 78.31 | 63.09 | −19.57 | 11.46 | 0.12 | 0.11 |
| 700 | 73.34 | 62.63 | −19.26 | 13.25 | 0.07 | 0.14 |
| 800 | 72.75 | 57.79 | −16.76 | 16.74 | 0.11 | 0.11 |
| 900 | 71.10 | 51.99 | −12.62 | 8.79 | 0.09 | 0.09 |
| 1000 | 66.66 | 49.00 | −5.17 | 8.44 | 0.09 | 0.09 |

First, compared to the fixed-bandwidth case the performance of max-min degraded significantly under the varying-bandwidth case. This is especially significant at smaller link buffer sizes (e.g., L=100, 200) where the estimation errors exceeded 100%. The reason for the poor performance is due to bandwidth variation which resulted in significant variations in the transmission delays. As the max-min method is based on the difference between maximum and minimum RTTs, the transmission delay variations significantly distorted the link buffer size estimates.

Second, the loss-pair algorithm performed substantially better than max-min under active estimation. This is because loss-pair does not base its estimation on the worst-case measurement, but determines the mathematical mode of the measured samples to filter out noises [6].

Comparing the passive estimation results in Table VI to the active estimation results in Table V, it will be observed that the estimation errors increase further for both max-min and loss-pair algorithms. By contrast, SoD according to the invention achieved a low level of estimation errors, smaller than 0.8 in all cases, which are two orders of magnitudes lower than max-min and loss-pair.

Queue Length Estimation in Fixed Bandwidth Networks

Evaluating queue length estimation algorithms over TCP flows, i.e., the data flow is regulated by the underlying TCP's flow and congestion control modules. Between three queue-length estimation algorithms, namely Vegas, FAST, and the present SoD, and three TCP variants, namely TCP CUBIC, TCP Vegas, and FAST TCP, there were six investigated combinations:

Vegas over TCP CUBIC—queue length estimated using the Vegas method during the congestion-avoidance phase of a TCP CUBIC flow;

Vegas over TCP Vegas—queue length estimated using the Vegas method during the congestion-avoidance phase of a TCP Vegas flow;

FAST over FAST TCP—queue length estimated using the FAST method during the slow-start and congestion-avoidance phases of a FAST TCP flow;

SoD over TCP CUBIC—queue length estimated using the SoD method during all three phases, i.e., slow-start, congestion-avoidance, and loss-recovery phases of a TCP CUBIC flow;

SoD over TCP Vegas—queue length estimated using the SoD method during all three phases, i.e., slow-start, congestion-avoidance, and loss-recovery phases of a TCP Vegas flow;

SoD over FAST TCP—queue length estimated using the SoD method during all three phases, i.e., slow-start, congestion-avoidance, and loss-recovery phases of a FAST TCP flow.

FIGS. 14 and 15 compare the relative and absolute estimation errors for the six combinations in fixed bottleneck link bandwidth networks. Except for the case with link buffer size of 100 packets, the FAST algorithm outperforms the two cases with the Vegas estimation algorithm. The FAST algorithm's anomaly is again due to its target queue length setting, 100 packets by default, too close to the link buffer size, thus causing frequent buffer overflows.

By contrast, the inventive SoD method worked well over all TCP variants. Table VII shows that the estimation errors are no more than 0.1% for all three TCP variants over all link buffer sizes, demonstrating SoD's consistent performance despite substantial variations in the underlying transport protocol.

TABLE VII

| | Type of TCP | | | | | |
| --- | --- | --- | --- | --- | --- | --- |
| | TCP CUBIC | | TCP Vegas | | FAST TCP | |
| L | Vegas (%) | SOD (%) | Vegas (%) | SOD (%) | FAST (%) | SOD (%) |
| 100 | 2.19 | 0.00 | 15.65 | 0.00 | 48.03 | 0.20 |
| 200 | 1.87 | 0.00 | 14.94 | 0.00 | 0.48 | 0.00 |
| 300 | 1.91 | 0.00 | 13.45 | 0.00 | 0.48 | 0.00 |
| 400 | 2.01 | 0.00 | 12.72 | 0.00 | 0.48 | 0.00 |
| 500 | 2.18 | 0.00 | 12.72 | 0.00 | 0.48 | 0.00 |
| 600 | 2.30 | 0.00 | 12.72 | 0.00 | 0.48 | 0.00 |
| 700 | 2.43 | 0.00 | 12.72 | 0.00 | 0.48 | 0.00 |
| 800 | 2.54 | 0.00 | 12.72 | 0.00 | 0.48 | 0.00 |
| 900 | 2.67 | 0.00 | 12.72 | 0.00 | 0.48 | 0.00 |
| 1000 | 2.75 | 0.00 | 12.72 | 0.00 | 0.48 | 0.00 |

Queue Length Estimation in Variable Bandwidth Networks

Next was investigated the algorithms' performance in mobile data networks using bandwidth trace data captured from production 3G/HSPA networks.

FIG. 16 and FIG. 17 plot the relative and absolute estimation errors for the six combinations over mobile data networks. The same results are also listed in Table VIII. Compared to the fixed bandwidth cases in Section C, the estimation accuracies for all three existing estimation algorithms increased significantly in variable bandwidth networks. The degradation in estimation accuracy for FAST over FAST TCP is particularly significant (e.g., from 0.48% to 14.3% for L=300). The reason for this is not yet clear and further analysis of FAST TCP's algorithm is warranted to identify the causes.

TABLE VIII

| | Type of TCP | | | | | |
| --- | --- | --- | --- | --- | --- | --- |
| | TCP CUBIC | | TCP Vegas | | FAST TCP | |
| L | Vegas (%) | SOD (%) | Vegas (%) | SOD (%) | FAST (%) | SOD (%) |
| 100 | 6.69 | 0.08 | 17.16 | 0.74 | 70.32 | 1.49 |
| 200 | 4.21 | 0.03 | 17.12 | 0.72 | 14.40 | 0.20 |
| 300 | 3.62 | 0.02 | 17.27 | 0.72 | 14.39 | 0.20 |
| 400 | 3.51 | 0.02 | 17.63 | 0.71 | 14.39 | 0.20 |
| 500 | 3.49 | 0.01 | 15.80 | 0.60 | 14.39 | 0.20 |
| 600 | 3.62 | 0.01 | 15.80 | 0.60 | 14.39 | 0.20 |
| 700 | 3.69 | 0.01 | 15.80 | 0.60 | 14.39 | 0.20 |
| 800 | 3.80 | 0.01 | 15.80 | 0.60 | 14.39 | 0.20 |
| 900 | 3.88 | 0.01 | 15.80 | 0.60 | 14.39 | 0.20 |
| 1000 | 3.95 | 0.01 | 15.80 | 0.60 | 14.39 | 0.20 |

In comparison, all SoD cases achieved consistently low level of estimation errors, under 1% in all cases, thus outperforming existing algorithms by multiple orders of magnitude. This clearly demonstrates SoD's superiority in estimating queue length in variable bandwidth networks.

Convergence

It takes time for the link buffer size estimation algorithms to collect measurement data to improve estimation accuracy. Therefore the convergent rates for max-min, loss-pair, and SoD were investigated in both fixed and variable bandwidth networks, using active and passive estimation.

First consider the baseline scenario of active estimation in a fixed-bandwidth network. FIGS. 18a to 18c plot the relative estimation error for bottleneck link bandwidths of 0.8 Mbps, 4.8 Mbps, and 7.2 Mbps respectively. There are three observations. First, the 0.8 Mbps case took considerable longer time to arrive at an accurate estimation compared to the two higher bandwidth cases (20 seconds vs. 4 seconds). This is expected as the rate at which measurement data are collected is proportional to the link bandwidth. Second, all three algorithms remained accurate once they converged. Third, max-min and SoD converged faster than loss-pair, due to the latter's design to determine the estimation from the mathematical mode of the collected samples.

Next consider the case of passive estimation (over TCP CUBIC) in a fixed-bandwidth network. FIGS. 19a to 19c plot the relative estimation error for bottleneck link bandwidths of 0.8 Mbps, 4.8 Mbps, and 7.2 Mbps respectively. Compared to the active estimation case, the SoD algorithm in this case converged faster than the max-min algorithm, especially in the two higher bandwidth cases (c.f. FIGS. 19b and 19c). It is also worth noting that the convergence time in general is similar to the active estimation case. This may be due to the TCP variant employed, i.e., CUBIC, where its congestion control algorithm tends to build up long queue of packets in the bottleneck link.

Next considering the varying bandwidth environment, the results are more interesting. FIGS. 20 and 21 compare the algorithms in active and passive estimation respectively. One notable observation is that the max-min algorithm did not converge at all. Beginning with an underestimated link buffer size, the estimated link buffer size increased continuously to become overestimation after about 5 seconds. The reason being that max-min assumes constant packet transmission time which is not true in a bandwidth-varying network. The bandwidth variations modulates the transmission time, thus introduces errors into the estimated result. As max-min's estimation is based on the difference between maximum and minimum measurement samples the difference will clearly increase with more samples collected. This again shows that the max-min algorithm, not being designed for bandwidth-varying networks, is not suitable for use in mobile data networks.

By contrast, the inventive SoD technique performed consistently and was able to arrive at an accurate estimation within 4-5 seconds, even in the extreme case of passive estimation over bandwidth-varying network.

Limitations in Passive Estimation

The Vegas queue-length estimation algorithm is limited to TCP's congestion-avoidance phase, and FAST TCP's algorithm is limited to TCP's slow-start and congestion-avoidance phases. By contrast, the inventive SoD technique can be applied to all three phases of TCP as it does not rely on TCP's congestion window in its estimation.

To further investigate their performances in different TCP phases we table the estimation errors separately for the three TCP phases in Table IX and X for fixed (C=7.2 Mbps, L=700 packets) and variable (averaged over 10 sets of bandwidth traces) bandwidth cases respectively. Not only did SoD work for all three phases, it consistently outperformed Vegas and FAST algorithms by multiple orders of magnitude. SoD's consistent accuracy in the loss recovery phase will be a particularly desirable property in mobile data networks, where non-congestion-induced packet losses are common.

TABLE IX

| Algorithms | TCP Phases | | |
|---|---|---|---|
| | Slow-Start | Congestion Avoidance | Loss Recovery |
| Vegas (TCP CUBIC) | N/A | 2.43 | N/A |
| Vegas (TCP Vegas) | N/A | 12.72 | N/A |
| FAST (FAST TCP) | 20.62 | 0.48 | N/A |
| SoD (TCP CUBIC) | 0.03 | 0.01 | 0.01 |
| SoD (TCP Vegas) | 0.87 | 0.01 | N/A (no loss) |
| SoD (Fast TCP) | 0.02 | 0.01 | N/A (no loss) |

TABLE X

| Algorithms | TCP Phases | | |
|---|---|---|---|
| | Slow-Start | Congestion Avoidance | Loss Recovery |
| Vegas (TCP CUBIC) | N/A | 3.69 | N/A |
| Vegas (TCP Vegas) | N/A | 15.80 | N/A |
| FAST (FAST TCP) | 19.02 | 6.69 | N/A |
| SoD (TCP CUBIC) | 0.01 | 0.01 | 0.02 |
| SoD (TCP Vegas) | 0.55 | 0.60 | N/A (no loss) |
| SoD (Fast TCP) | 0.10 | 0.06 | N/A (no loss) |

Finally, as shown from the simulation result above, the inventive sum-of-delays technique consistently achieved very low estimation errors in both link buffer size and queue length estimation, no more than 1% in most cases, even under the most challenging conditions. This confirms that by incorporating the measured transmission delays in estimating the link buffer size and queue length, we can effectively incorporate and compensate for the link bandwidth variations. The sum-of-delays technique is a promising candidate for application to both network measurement tools, even in short-lived measurement, as well as for in-band measurement to be integrated into existing transport/application protocols.

The invention has been explained with reference to specific embodiments. Other embodiments will be evident to those of skill in the art. The invention has many uses and is a mechanism to develop further inventions. Knowledge of the link buffer size and queue length can be exploited at various layers to enhance the performance of network applications. For example, transport layer protocols such as TCP can be modified to integrate the sum-of-delays algorithm to perform passive estimation of the link buffer size so that the latter can be exploited in its congestion control algorithm to improve bandwidth utilization while still preventing network congestion. The TCP-QA module described above is one specific method to realize this. At the application layer, the sum-of-delays algorithm can also be employed to incorporate the link buffer size and queue length information into congestion control, resource allocation, traffic policing, error control, and the like. Therefore, the invention should not be considered to be limited except as indicated by the appended claims.

What is claimed is:

1. A method operative in a digital computer comprising:
estimating packet transmission delays of packets sent via a wireless network subject to variable bandwidth;
estimating queuing delays of packets sent via the wireless network between a sender and a receiver, with compensation for variations in packet transmission delays; and
estimating network queue length from a sum of the packet transmission delays and the queuing delays,
wherein said sum of packet transmission delays comprises a measurement of in-band data and ACK packet timings in passive estimation to eliminate need for transmission of extra measurement packets.

2. A method operative in a digital computer comprising:
estimating packet transmission delays of packets sent via a wireless network subject to variable bandwidth;
estimating queuing delays of packets sent via the wireless network between a sender and a receiver, with compensation for variations in packet transmission delays; and
estimating network queue length from a sum of the packet transmission delays and the queuing delays,
wherein the queuing delays are estimated from an upper bound and a lower bound computed from packet transmission delays and round-trip times.

3. The method according to claim 2 wherein the upper bound of queuing delays is computed from the sum of packet transmission delays.

4. The method according to claim 2 wherein the lower bound of queuing delay for a packet is computed from its round-trip times, the minimum round-trip time, and its transmission delay.

5. A method operative in a digital computer comprising:
estimating packet transmission delays of packets sent via a wireless network subject to variable bandwidth;
estimating queuing delays of packets sent via the wireless network between a sender and a receiver, with compensation for variations in packet transmission delays; and
estimating network queue length from a sum of the packet transmission delays and the queuing delays,
wherein the network queue length is computed from the lower bound wherein the upper bound of queuing delays is computed from the sum of packet transmission delays and wherein the upper bound of queuing delay for a packet is computed from its round-trip times, the minimum round-trip time, and its transmission delay.

6. A method operative in a digital computer comprising:
estimating packet transmission delays of packets sent via a wireless network subject to variable bandwidth;
estimating queuing delays of packets sent via the wireless network between a sender and a receiver, with compensation for variations in packet transmission delays; and
estimating network queue length from a sum of the packet transmission delays and the queuing delays,
wherein said sum of packet transmission delays comprises measuring in-band data and ACK packet timings in passive estimation to eliminate need for transmission of extra measurement packets.

7. A method operative in a computer comprising:
estimating the packet transmission delays of packets sent via a wireless network;
estimating the queuing delays of packets sent via said network between a sender and a receiver, with compensation for variations in the packet transmission delays by using measurements of packet transmission time at a bottleneck link;
estimating the network queue length from the sum of the packet transmission delays and the queuing delays; and
estimating the network link buffer size from the estimated queue lengths in order to provide a sum-of-delays method that incorporates effects of bandwidth variations wherein the queuing delays are estimated from an upper bound and a lower bound computed from packet transmission delays and round-trip times.

8. The method according to claim 7 wherein the upper bound of queuing delays is computed from the sum of packet transmission delays.

9. The method according to claim 7 wherein the lower bound of queuing delay for a packet is computed from its round-trip times, the minimum round-trip time, and its transmission delay.

10. The method according to claim 7 wherein the network link buffer size is estimated from taking the maximum of all the queue length estimates.

11. A method according to claim 7 wherein results of said estimation of queue length with compensation for variations in packet transmission delays is used for congestion control in a communications protocol.

12. The method according to claim 11 incorporated into a transport protocol.

13. The method according to claim 11 incorporated into a transport protocol TCP-QA which is implemented at the sender only and is compatible with existing standard TCP receivers.

14. The method according to claim 13 comprising executing the following steps for TCP's congestion avoidance phase (TCP_QA_CA( )), for updating TCP's slow-start threshold (TCP_QA_SSTH( )), and for the initialization phase (TCP_QA_INIT( )):

```
TCP_QA_CA()
{
    if (Queue_length < target_qs)
    //burst start phrase
        cwnd=cwnd+1
    else
    {
    //slow decrement phrase cwnd = cwnd − 1/cwnd

}
}
```

```
TCP_QA_SSTH()
{
    if(packet_loss_event)
    {
        if (Queue_length > target_qs)
            cwnd = cwnd / 2
    }
}

TCP_QA_INIT()
{
    // burst init phrase
    if (burst_start_enabled)
        cwnd = min(awnd, 64)
}.
```

* * * * *